(12) United States Patent
Carey et al.

(10) Patent No.: US 12,077,641 B2
(45) Date of Patent: Sep. 3, 2024

(54) COMPOSITES, SYSTEMS AND METHODS OF MAKING THE SAME

(71) Applicant: Battelle Memorial Institute, Columbus, OH (US)

(72) Inventors: Brent J. Carey, Columbus, OH (US); Christopher F. Buurma, Gahanna, OH (US); Richard G. Rateick, Jr., South Bend, IN (US); Philip P. Cheney, Bexley, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 17/691,692

(22) Filed: Mar. 10, 2022

(65) Prior Publication Data

US 2023/0235134 A1 Jul. 27, 2023

Related U.S. Application Data

(60) Provisional application No. 63/210,952, filed on Jun. 15, 2021, provisional application No. 63/159,425, filed on Mar. 10, 2021.

(51) Int. Cl.
| | |
|---|---|
| *B33Y 10/00* | (2015.01) |
| *B29C 64/106* | (2017.01) |
| *B33Y 40/20* | (2020.01) |
| *B33Y 70/00* | (2020.01) |
| *C01B 32/19* | (2017.01) |
| *C01B 32/225* | (2017.01) |
| *C08J 3/28* | (2006.01) |
| *C08J 5/00* | (2006.01) |

(52) U.S. Cl.
CPC .............. *C08J 3/28* (2013.01); *B29C 64/106* (2017.08); *B33Y 10/00* (2014.12); *B33Y 40/20* (2020.01); *B33Y 70/00* (2014.12); *C01B 32/19* (2017.08); *C01B 32/225* (2017.08); *C08J 5/005* (2013.01)

(58) Field of Classification Search
CPC ... B29C 64/268; C01B 32/184; C01B 32/205; C08J 5/005
See application file for complete search history.

(56) References Cited

U.S. PATENT DOCUMENTS

| | | |
|---|---|---|
| 2010/0314081 A1 | 12/2010 | Reis et al. |
| 2014/0011118 A1 | 1/2014 | Lee et al. |
| 2019/0330064 A1* | 10/2019 | Tour ..................... B01D 71/021 |

OTHER PUBLICATIONS

International Search Report and Written Opinion from corresponding PCT Appln. No. PCT/US2022/019761, mailed Jun. 30, 2022. 13 pages.
Ferrari, "Raman Spectroscopy of Graphene and Graphite: Disorder, Electron-Phonon Coupling, Doping and Nonadiabatic Effects", Solid State Communications 143, 2007, pp. 47-57.
Ye et al., "Laser-Induced Graphene: from Discovery to Translation", Advanced Materails, 2019, vol. 31, 15 pages.

* cited by examiner

*Primary Examiner* — Vu A Nguyen
(74) *Attorney, Agent, or Firm* — Grossman, Tucker, Perreault & Pfleger, PLLC; Steven J. Grossman

(57) ABSTRACT

The present disclosure relates to composites, systems, and methods for making the same. In particular, the present disclosure relates to composites that are useful for thermal protection applications, and systems and methods for making the same.

13 Claims, 22 Drawing Sheets

1701

COMPOSITES, SYSTEMS AND METHODS OF MAKING THE SAME

CROSS-REFERENCE TO RELATED APPLICATIONS

This application claims the benefit of U.S. Provisional Application Ser. No. 63/159,425 filed Mar. 10, 2021 and U.S. Provisional Application Ser. No. 63/210,952, filed Jun. 15, 2021, which are fully incorporated herein by reference.

TECHNICAL FIELD

The present disclosure relates to composites, systems, and methods for making the same. In particular, the present disclosure relates to composites that are useful for thermal protection applications, and systems and methods for making the same.

BACKGROUND

The development of advanced materials for hypersonic platforms is important to national defense and commercial aerospace applications. At high speeds, the temperature of materials used to form aircraft and projectiles (e.g., nose cones, leading edges, control surfaces and the like) can exceed 2200° C. due to aerodynamic heating at flight speeds of up to MACH 20. Thermal protection systems (TPS) systems employing carbon-carbon (C/C) composites have been developed to protect sensitive components of aircraft and projectiles to improve their durability at such speeds.

C/C composites are typically manufactured by filling spaces in a multi-dimensional weave of carbon fiber with a relatively carbon-rich matrix via liquid or vapor phase infiltration, after which the resulting structure is slowly heat treated in a furnace at 1,000-1,500° C. to drive off everything except carbon. The resulting carbonized structure may then be subjected to a 1,500-2,750° C. heat treatment to refine the crystal structure (e.g., to form graphitic ($sp^2$ hybridized) carbon), resulting in improved high temperature stability and strength. This process can take months to produce a single part, as rapid heat treatment can lead to the development of defects (e.g., pores, cracks, etc.) that can lead to critical failure of the part and/or poor mechanical characteristics. Consequently, traditional processes for forming C/C composites are extremely expensive due to the repeated high-temperature heating cycles and the need for specialized capital equipment needed for processing large parts. Moreover, traditional processes for forming C/C composites have significant failure rate due to the formation of mechanically compromised porous and brittle structures that can result from bulk high-temperature heat treatment. As a result, conventional processes for forming C/C composites may be pragmatically or economically difficult to implement in large scale projects, or with projects that require part delivery within a short time frame.

Accordingly, a need remains in the art for the development of new composites that can be formed relatively rapidly and at scale, with desirable physical and thermal properties. The present disclosure is aimed at that need.

SUMMARY

A composite part comprising a substrate, a subsurface layer comprising graphite with a cellular structure, a graphitic layer, wherein the graphitic layer comprises graphite in an amount greater than the graphite in said subsurface layer.

A method of forming a composite part comprising providing a substrate having polymer resin and one or a plurality of additives and performing, with a laser, a first heating operation on the polymer resin and one or a plurality of additives and forming a subsurface layer on the substrate, the subsurface layer comprising graphite with a cellular structure. This can be followed by performing, with a laser, a second heating operation on the subsurface layer and forming a graphitic surface layer on the subsurface layer, wherein the graphitic layer comprises graphite in an amount greater than the graphite present in the subsurface layer. The method may be accomplished by additive manufacturing.

A method of forming a composite part comprising providing a substrate having pitch and performing, with a laser, a first heating operation on the pitch and forming a subsurface layer on the substrate, the subsurface layer comprising graphite with a cellular structure. This can then be followed by performing, with a laser, a second heating operation on the subsurface layer and forming a graphitic surface layer on the subsurface layer, wherein the graphitic layer comprises graphite in an amount greater than the graphite present in the subsurface layer.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications, and variations thereof will be apparent to those skilled in the art.

DETAILED DESCRIPTION

The present disclosure relates to composite parts that are formed by selective heating of a precursor material with a laser. Application of the laser is controlled to thermally induce specific material changes that yield a composite that has desirable thermal properties for thermal protection system applications, such as one or more of the following: 1) relatively high thermal insulation properties in the thickness direction due to the microstructure of the material; and 2) relatively high lateral thermal conductively along its surface due to the presence of a graphitic layer at the surface; and/or 3) superior mechanical performance as compared to typical refractory composites due to the preservation of a polymer matrix composite (PMC) substrate.

Control over the laser is preferably implemented with a computer controller, which can adjust material processing parameters (e.g., laser residence time, laser power, number of passes, etc.) on material simulations and/or measurement data, such that local application of laser energy is tuned (e.g., in real time) to achieve desired physical and/or material characteristics. The result is a robust composite that can function as a highly effective thermal protection system for aerospace applications, e.g., by readily egressing and shedding residual heat from aerodynamic heating.

Figure 1:
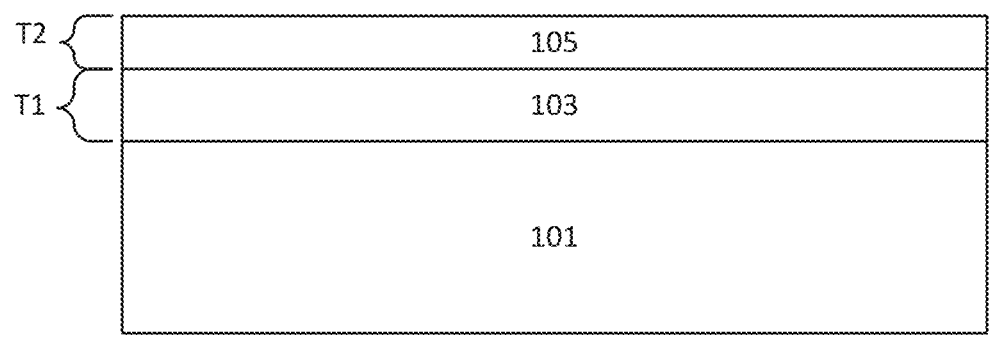
FIG. 1 is a block diagram of one example of a composite consistent with the present disclosure.
Figure 5A:
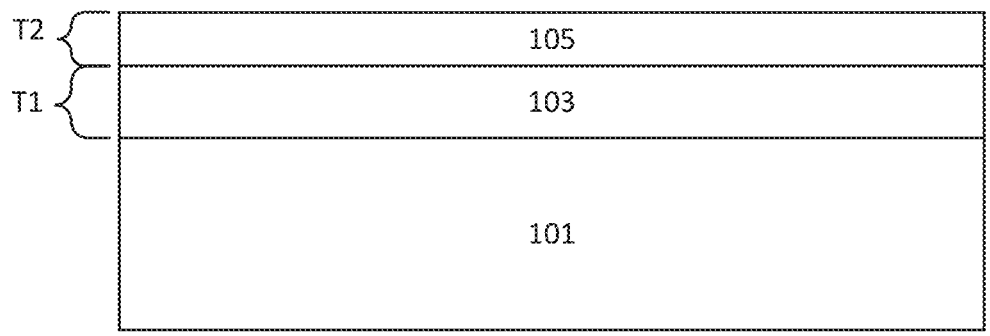
FIGS. 5A and 5B are block diagrams that stepwise illustrate formation of another example C/C composite consistent with the present disclosure.
Figure 5B:
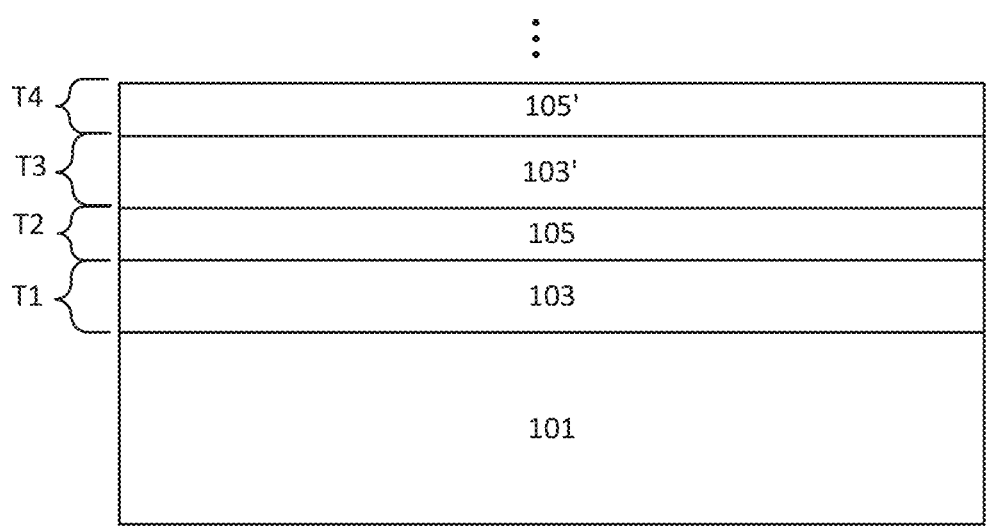

FIGS. 1 and 5B are block diagrams that illustrate the preparation of preferred composites consistent with the present disclosure. In the embodiment of FIG. 1, composite 100 includes a substrate 101, a subsurface layer 103, and a graphitic layer 105. While only a single subsurface layer 103 and single graphitic layer 105 are shown in FIG. 1, more than one of such layers may be present.

For example, and as shown in FIG. 5B, the composites described herein may include a plurality of alternating subsurface layers 103 and graphitic layers 105. For example, composite 100 may include 2, 3, 4, 5, 6, 7, 8, 9, 10 or more alternating subsurface and graphitic layers 103, 105, wherein the number of subsurface layers 103 and graphitic layers 105 may be the same or different. In embodiments the number of subsurface layers and graphitic layers may be the same.

Substrate 101 preferably comprises a material that is capable of undergoing thermally activated microstructural changes (thermal treatment) as discussed herein to provide for subsurface layer 103 which subsurface layer 103 upon thermal activation is capable of providing graphitic layer 105. Preferably, substrate 101 comprises a polymer matrix composite (PMC) material including polymer matrix resin and one or more additives such as carbon fibers, single and/or multi-walled carbon nanotubes (CNT), graphene, graphene oxide (GO), reduced graphene oxide (RGO), carbon black (CB), and/or boron nitride nanotubes (BNNT). The polymer matrix resin may preferably be selected from phenolic resins, polyaryletherketones (PAEK), polyether ketones (PEK), polyetheretherketone (PEEK), polyetherketoneketone (PEKK), polyether ketone ether ketone (PEKEKK), polyetherimide (PEI), polyimides, polyphenylene, polyarylacetylene, phthalonitrile, benzoxazine, PAEK co-polymer with PEI and/or polyethersulfone (PES) and/or polyphenylenesulfide (PPS), and blends thereof. Phenolic resins are reference to polymer resins obtained by the reaction of phenol or substituted phenol with formaldehyde.

Preferably, the polymer matrix resin in the PMC is present at a level in the range of 20.0% (wt.) to 80.0% (wt.) and the level of additive(s) present is in the corresponding range of 80.0% (wt.) to 20.0% (wt.). As may be appreciated, when the substrate is a polymer matrix material, such polymer matrix material can serve to provide both a source for formation of the subsurface layer 103 and graphitic layer 105, and the remaining portion of the polymer matrix material can then provide mechanical strength to the composite once formed.

Preferably, when the additives are the carbon fibers, such fibers may preferably comprise carbon fiber weaves. A weave of carbon fibers may be understood herein as fibers of carbon that are woven, which woven fibers may include plain, twill and harness satin. A plain weave, e.g., is one in which the tows are woven in an over/under type pattern. The aforementioned additives are therefore those that preferably increase graphitization, nucleate crystallization, and/or improve mechanical performance.

The substrate herein may also preferably comprise pitch, which is also contemplated of undergoing thermally activate microstructural changes. Pitch is reference to a mixture of macromolecular compounds comprising polycyclic aromatic compounds, which can be heated to pyrolyze and provide graphene structures. Graphene structure is reference to the two-dimensional form of crystalline carbon that relies upon a hexagonal lattice. Such heating of the pitch, as also noted herein, may preferably rely upon laser type heating. The pitch may preferably be derived from petroleum, coal tar or plants. The pitch may more preferably be obtained from crude oil which is subjected to distillation and/or vacuum distillation where the residue contains what is termed as pitch. The softening temperature of a preferred pitch may therefore preferably fall in the range of 110 C to 175 C.

The substrate 101, whether sourced from a polymer matrix composite containing one or more of the aforementioned additives, or sourced from pitch, may preferably be initially present at a thickness of 8.0 mm to 150.0 mm, before undergoing laser heating.

The subsurface layer(s) 103, 103' are preferably formed by treating all or a portion of a surface of substrate 101 (or a subsequently applied layer of PMC or pitch material) with a laser, as will be discussed in further detail below. In general, the subsurface layers 103, 103' comprise, consist essentially of, or consist of carbon. In embodiments, subsurface layers 103, 103' comprise, consist, or consist essentially of graphite with a three-dimensional cellular structure as described below.

The parameters used during the application of the laser (residence time, power (intensity), cooling, spot size, etc.) may be controlled such that a portion of the substrate 101 is converted into a subsurface layer 103, 103' that is preferably in the form of a graphitized carbon foam cellular material that has desired thermal insulation properties. A graphitized carbon foam is reference to the feature that the foam contains a plurality of layers of graphene. Application of the laser during the production of the subsurface layer 103, 103' may be controlled with a controller based at least in part on modeled, measured, and/or real time data of the article in production.

In embodiments the subsurface layer(s) 103, 103' each have a cellular (e.g., foamed) structure. As used herein, the term "cellular structure" when used in conjunction with a layer, means that the layer includes pores preferably having a diameter ranging from greater than 0 to about 150 microns (µm), such as from greater than 0 to about 100 µm, or preferably from greater than or equal to about 10 µm to about 50 µm. Put differently, pores in the subsurface layer(s) 103, 103' may preferably make up greater than 0 to about 50 percent by volume of subsurface layer(s) 103, 103', such as from about 10 to about 40 percent by volume, or even about 10 to about 40% by volume.

The above subsurface layer(s) indicate a relatively low thermal conductivity in thickness. That refers to the feature that the subsurface layer preferably has a through plane, perpendicular to the surface, indicating a thermal conductivity of less than or equal to about 5 Watts per meter per Kelvin, such as less than or equal to about 2.5 Watts per meter per Kelvin, or even less than or equal to about 1.0 Watt per meter per Kelvin. The subsurface layers 103, 103' preferably have a thickness T1, perpendicular to the surface of the subsurface, in a range of greater than or equal to about 500 microns to about 5.0 mm, including all values and increments therein, or in the range of greater than or equal to about 500 microns to about 3.0 mm. The graphitic layer may have a thickness T2 perpendicular to the graphitic layer surface in the range of about 300 microns to about 1.5 mm. The subsurface layer is therefore preferably thicker than the graphitic layer.

Once a subsurface layer 103, 103' has been formed, a laser may be selectively applied to next convert a portion of the subsurface layer 103, 103' to form an upper graphitic layer 105, 105'. As alluded to above, the term "graphitic layer" means that the layer includes (i.e., comprises), consists, or consists essentially of graphitic carbon, i.e., carbon that has a graphite crystal structure and/or is in the form of graphene.

The preferred parameters used during application of the laser (residence time (raster rate), power (intensity), cooling, spot size, overlap, etc.) may be controlled to induce formation of a graphitic layer 105, 105' on a surface of an underlying subsurface layer 103, 103'. The graphitic layers 105, 105' may be characterized by the presence of a relatively higher amount of graphite and/or graphene as compared to the graphite/graphene content of a subsurface layer 103, 103'. This may be evidenced by the presence of relatively higher crystallinity in a graphitic layer 105, 105' than a subsurface layer 103, 103'. Preferably, in embodiments graphitic layers 105, 105' have a crystallinity that is about 10, 20, 30, 40, or even 50% higher (or more) than the crystallinity of an underlying subsurface layer 103, 103' (e.g., the subsurface layer 103, 103' immediately underlying the graphitic layer 105, 105'). In general, graphitic layer(s) 105, 105' include (comprise), consist essentially of, or consist of graphite in an amount greater than an amount of graphite in the subsurface layer(s) 103, 103'.

The amount of graphite/graphene in graphitic layer(s) 105, 105' relative to an underlying subsurface layer(s) 103, 103' may be preferably determined using Raman spectroscopy. For example, and as understood in the art, Raman spectroscopy of carbon structures often reveals peaks in three distinct bands, i.e., the D, G, and 2D bands. Peaks in the D band typically lie around 1100-1360 $cm^{-1}$, and are indicative of $sp^3$ hybridized carbon (e.g., defects in the carbon lattice). In contrast, peaks in the G band typically lie around 1500-1650 $cm^{-1}$, and are indicative of $sp^2$ hybridized carbon, i.e., carbon with a graphite and/or graphene structure. Peaks in the 2D band typically appear around 2640 $cm^{-1}$ and 2580 $cm^{-1}$ and are also indicative of carbon with a graphite or graphene crystal structure.

Whether a sample has a graphene or graphite structure can be indicated by the relative height of the G and 2D peaks, with graphite samples having a G peak that is higher than the 2D peak, and graphene samples having a 2D peak that is higher than the G peak. As used herein, the term "graphitic layer" refers to a layer that comprises, consists of, or consists essentially of graphite, graphene, or a combination thereof. Preferably, a graphitic layer is at least 40, 60, 80, 90, 95, or even 99% graphite, graphene, or a combination thereof. More information concerning Raman spectroscopy of carbon can be found in Andrea Ferrari, *Raman Spectroscopy of Graphene and Graphite, Disorder, Electron-Phonon Coupling, Doping, and Nonadiabatic Effects*, Solid State Communications 143, pages 47-57, 2007, which is incorporated herein by reference in its entirety.

Figure 2:
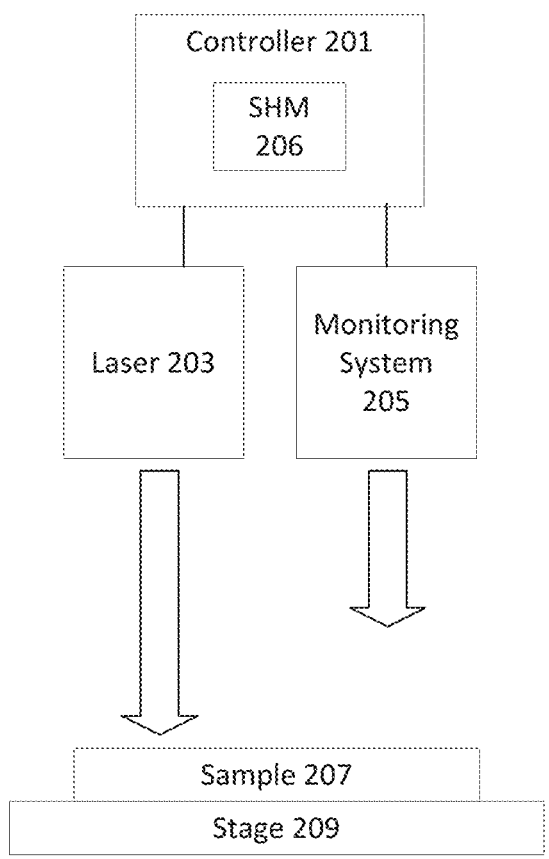
FIG. 2 is a schematic diagram of one example of a system for forming a composite consistent with the present disclosure.

FIG. 2 schematically illustrates one preferred example of a system 200 for forming a composite material consistent with the present disclosure. As shown, system 200 includes a controller 201 that is communicatively coupled to a laser 203 (e.g., a $CO_2$ laser, a diode laser, or the like) and a monitoring system 205 in any suitable manner. In general, system 200 is configured to treat a surface of a sample 207 that includes a substrate 101 with a laser 203, resulting in the formation of a composite that includes one or more subsurface layers 103, 103' and one or more graphitic layers 105, 105'.

System 200 is generally configured to subject selected surface areas of sample 207 to a laser, resulting in conversion of all or a portion of the material forming such surfaces into a subsurface layer 103 or a graphitic layer 105. That is, through controlled laser dosing, selective areas of sample 207 are heated to carbonize, pyrolyze, and/or graphitize the surfaces thereof in situ, resulting in the formation of a subsurface layer 103 and then graphitic layer 105 with desired characteristics (e.g., desired material properties and/or microstructure). For example, system 200 may selectively apply a laser to perform first selective heat treatment operations on sample 207 to form a subsurface layer 103 with a cellular structure and relatively low thermal conductivity in a thickness direction of composite 100, perpendicular to the surface. As noted, a preferred thermal conductivity of less than or equal to about 5 Watts per meter per Kelvin.

System 200 may then selectively apply a laser to perform second selective heat treatment operations (e.g., on a previously formed subsurface layer 103 and/or substrate 101 to form a graphitic layer 105. The graphitic layer is characterized by preferably having a thermal conductivity on its surface that is at least twice the thermal conductivity of its thickness, or more preferably, a thermal conductivity on its surface that is in the preferred range of twice (2×) to one hundred times (100×) the thermal conductivity that the graphitic layer has in thickness, perpendicular to the graphitic layer surface. That is, the thermal conductivity of the graphitic layer surface ($TC_{SURFACE}$) and the thermal conductivity that the graphitic layer has in thickness perpendicular to the graphitic layer surface ($TC_{THICKNESS}$) follow the following expression:

$$TC_{SURFACE} = (2-100) \times (TC_{THICKNESS})$$

The graphitic layer 105 as noted preferably has a thickness in the range of 300 microns to 1.5 mm and the thermal conductivity on the surface of the graphitic layer 105 is preferably in the range of about 10 Watts per meter per Kelvin to about 600 Watts per meter per Kelvin. This is reference to thermal conductivity in a direction that is parallel to the surface of the graphitic layer.

With the foregoing in mind, controller 201 preferably includes a selective heating module (SHM 206). In this specific context, the term "module" refers to software, firmware, circuitry, and/or combinations thereof that is/are configured to perform or cause the performance of one or more selective heating operations consistent with the present disclosure. Software may be embodied as a software package, code, instructions, instruction sets and/or data recorded on non-transitory computer readable storage mediums, e.g., integral or separate from controller 201. Firmware may be embodied as code, instructions or instruction sets and/or data that are hard-coded (e.g., nonvolatile) in controller 201, e.g., within a memory thereof (not shown) or other computer readable storage.

In preferred embodiments, SHM 206 is in the form of logic that is implemented at least in part in hardware to perform selective heating operations on a sample. SHM 206 may be in the form of computer readable instructions which when executed by a processor (e.g., of controller 201) may cause controller 201 to perform or instigate performance of selective heating operations with laser 203 on a sample 207. Examples of selective heating operations that may be performed include treating sample 207 (which may initially be a coupon of PMC material discussed above or a layer of PMC material on substrate 101) with laser 203 to form a subsurface layer 103, 103', and then treating the resulting subsurface layer 103, 103' (or a layer of PMC material thereon) with laser 203 to form an upper graphitic layer 105, 105'.

In preferred embodiments controller 201 (or, more specifically, SHM 206) is configured to control the treatment of sample 207 with laser 203 based at least in part on sensor data. The sensor data may be used to monitor and adjust the operational parameters used to form subsurface and upper graphitic layers to achieve desired performance. For example, a sensor may monitor the temperature of the sample as it is being subjected to treatment with the laser and output a sensor signal indicative of the temperature of the sample to the controller 201. Controller 201 (or, more specifically, SHM 203) may then adjust the operational characteristics of the laser (e.g., laser power level (photon density), residence time (time spent on a particular location of the sample), pass rate (when laser and/or the stage on which the sample is mounted moved), hatch (the degree to which the laser overlaps a previously treated spot during treatment of another spot), etc., combinations thereof and the like. This may be useful in instances where application of the laser results in the build-up of residual heat in the sample. In such instances, the residual heat may cause the heat treatment applied by the laser to proceed too quickly or to exceed a desired heat treatment temperature, potentially resulting in the formation of undesirable structures in the material. While the following description focuses on operations of controller 201, such operations may also be performed (or caused to be performed) by SHM 206.

As will be described in more detail below in connection with FIG. 3, sample 207 may include or be in the form of a substrate 101 as discussed above. The sample 207 may be provided on a stage 209, which may be fixed movable relative to a position of laser 203 and/or monitoring system 205. Regardless of whether stage 209 is a fixed stage, laser 203 and/or monitoring system 205 may be movable relative to sample 207. In any case, controller 201 may be configured to cause laser 203 to perform selective heating operations on a portion of sample 207, resulting in the formation of one or more subsurface layers 103, 103' and one or more graphitic layers 105, 105'.

When such operations on one portion of sample 207 are concluded, the laser 203 may be used to treat another portion of sample 207 (e.g., by movement of sample 207 relative to laser 203, movement of laser 203 relative to sample 207, or both). That is, sample 207 and/or laser 203 may move relative to one another, e.g., in a raster pattern, such that laser light emitted by laser 203 impinges on different areas of sample 207 during the production of a composite 100. The method may continue until all (or at least the desired portion) of sample 207 is treated with laser 203.

For example, controller 201 may be configured to cause laser 203 to impinge on a first portion of the surface of sample 207 (e.g., a surface of substrate 101 or a layer of PMC material thereon) to form a portion of a subsurface layer 103 that has a porous (e.g., graphitized foamed) structure as discussed above. In such instances, controller 201 may control application of the laser (e.g., duration of application, intensity (power), etc.) to form the subsurface layer with desired characteristics. More specifically, controller 201 may be configured to implement a first selective heating operation, during which laser 203 is applied to substrate 207 for a time and at an intensity that is sufficient to impart a desired heating profile to at least a portion of substrate 101, resulting in the formation of a portion of subsurface layer 103 having a porous structure as discussed herein.

Following application of the laser 203 to the first portion of sample 207, laser 203 may be used to treat other (e.g., second, third, fourth, etc.) portions of sample 207, until a desired subsurface layer 103, 103' is formed. By way of example, during the first selective heating operations controller 201 may cause laser 203 to operate at a preferred power level of about 10 to 45 watts (e.g., 24, or 30 watts) of continuous power, with the sample 207 or laser 203 moving at a raster (stepping) rate in a preferred range of greater than 0 to 50 mm/s (e.gf., about 2 to about 10 mm/s) in a snake (zig-zag) pattern, with a raster step size in a preferred range of greater than 0 to about 2 mm (e.g., between about 0.2 to about 1.0 mm).

The parameters used (e.g., laser application time, laser power/intensity, etc.) during the first heating operation may be dictated or otherwise based on data obtained from simulations of heating characteristics of the preferred materials used in substrate 101. Alternatively, or additionally, the parameters applied during the first heating operation may be dictated or controlled based on a sensor signal that is obtained before or after execution of the first selective heating operation. For example, monitoring system 205 may be configured to monitor sample 207 during application of laser 203 during the first selective heating operation and provide a first sensor signal to controller 201. The first sensor signal may include information that may enable controller 201 to determine whether a desired heating profile is being applied to a surface of sample 207, i.e., whether laser 203 is being applied in such a manner as to result in the formation of a subsurface layer 103 with desired characteristics.

For example, in embodiments monitoring system 205 includes one or more sensors or sensor instruments that can inspect sample 207, e.g., during or after application of the first (or subsequent) selective heating operations. For example, in embodiments sensor system 205 may include a thermal (infrared) camera which may be configured to monitor a heat profile applied to a surface of sample 207 during the first heating operation, and to provide a first sensor signal indicative of that heating operation to controller 201. The controller 201 may be configured to determine a measured heating profile from the first sensor signal and compare the measured heating profile to a target heating profile that is known or designed to produce a desired subsurface layer 103. The target heating profile may be a measured heating profile from a known good sample and/or a product of simulations based on the materials involved.

Figure 7:
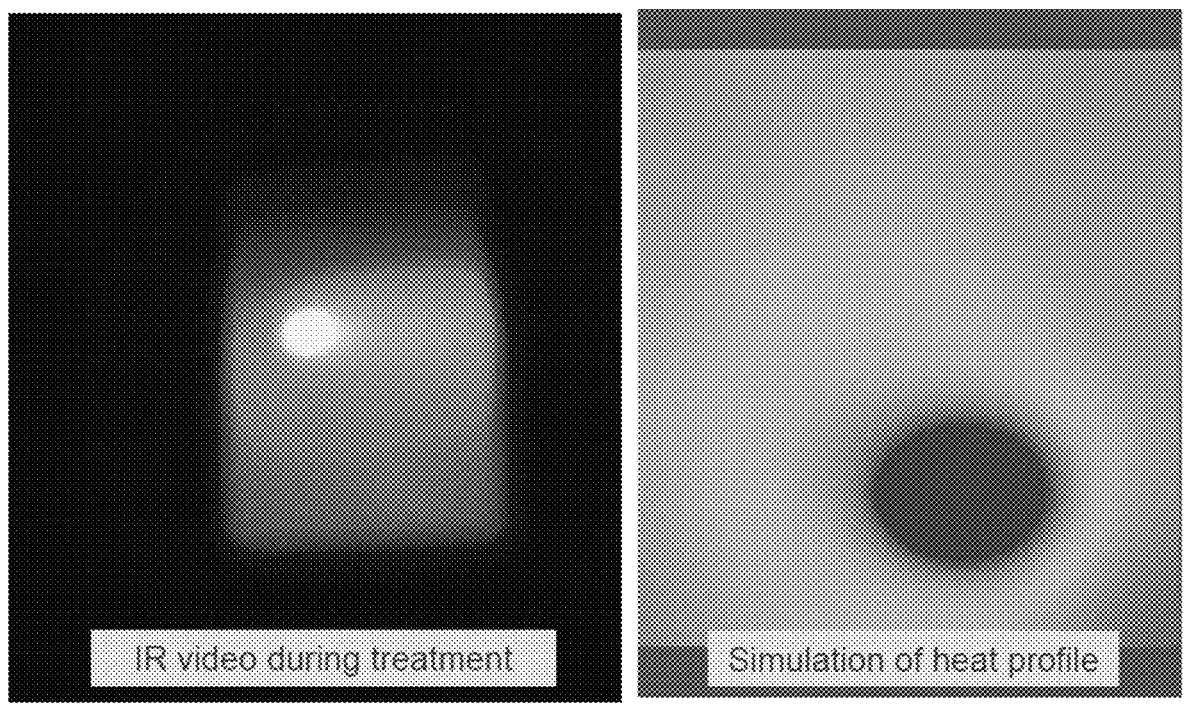
FIG. 7 depicts a measured IR image and simulated IR image that may be used in one example of a system for forming a composite consistent with the present disclosure.

One example of a measured heating profile and a simulated/target heating profile is shown in FIG. 7. If controller 201 determines that the measured heating profile is in accordance with the target heating profile, application of the laser on another location of sample 207 may proceed without modification. If controller 201 determines that the measured heating profile differs by greater than a threshold amount from the target heating profile, however, controller 201 may adjust the parameters of the first heating operation, e.g., before application of laser 203 to another location on sample 207.

Similarly, monitoring system 205 may preferably include a pyrometer that is configured to measure a peak temperature applied to sample 207 during the first selective heating operation. In such instances monitoring system 205 may be configured to send a sensor signal indicative of a measured peak temperature applied to sample 207 to controller 201. Controller 201 may be configured to determine whether the measured peak temperature applied to the current location of sample 207 is in accordance with a target peak temperature, wherein the target peak temperature is a peak temperature measured during production of a known good sample, or a peak temperature obtained from simulations based on the materials involved. If controller 201 determines that the measured peak temperature is in accordance with target peak temperature, application of the laser 203 to another location of sample 207 may proceed without modification. If controller 201 determines that the measured peak temperature differs from the target peak temperature by greater than a threshold amount, however, controller 201 may adjust the parameters of the first heating operation, e.g., before application of laser 203 to another location on sample 207.

In those or other embodiments monitoring system 205 may include one or more spectrometers, such as a Raman spectrometer, infrared spectrometer, ultraviolet visible spectrometer, or the like. In such instances, monitoring system 207 may be configured to measure a spectrum of a surface of sample 207, e.g., during or after application of a first heating operation to a location thereof. Monitoring system 207 may then send a sensor signal indicative of the measured spectrum measured from sample 207 to controller 201. Controller 201 may be configured to determine and compare the measured spectrum to a target spectrum. The target spectrum may be a measured spectrum from a known good sample and/or a simulated spectrum produced by simulations based on the materials involved. If controller 201 determines that the measured Raman spectrum is in accordance with the target Raman spectrum, application of the laser 203 to another location of sample 207 may proceed without modification. If controller 201 determines that the measured Raman spectrum differs by greater than a threshold amount from the target Raman spectrum, however, controller 201 may adjust the parameters of the first selective heating operation, e.g., before application of laser 203 to another location on sample 207.

Following execution of the first selective heating operations (e.g., on all or a select portion of sample 207), controller 201 may be configured to cause laser 203 (or another laser, not shown) to impinge on sample 207, resulting in the formation of a portion of a graphitic layer 105, 105' thereon. In embodiments, controller 201 causes laser 203 to impinge on a portion of sample 207 bearing a portion of subsurface layer 103, 103' thereon, thereby converting a portion of the subsurface layer 103, 103' to a graphitic layer 105, 105'

Alternatively, controller 201 is configured to cause laser 203 to impinge on a layer of material that is deposited on a surface layer 103, 103', thereby converting all or a portion of the layer into a graphitic layer 105, 105'. The graphitic layer that is formed may be characterized by a desired level of graphite content and/or crystallinity, as may be determined by inspection with various instruments such as a Raman spectrometer.

More specifically, controller 201 may be configured to implement second selective heating operations on sample 207, during which laser 203 is applied to substrate 207 (or, more specifically, to a subsurface layer 103, 103' or a layer of PMC or pitch material thereon). During the second selective heating operations, the laser 203 may be applied to substrate 207 for a time and at an intensity that is sufficient to impart a desired heating profile to at least a portion of a previously formed portion of a subsurface layer 103, 103' and/or a layer of PMC or pitch material thereon). The operational parameters used during a second selective heating operation may be substantially similar to those used in the first selective heating operation, except insofar as they may use a larger laser spot size, a slower raster speed, and multiple treatment cycles on the same location of sample 207.

When laser 203 is applied to a portion of a subsurface layer 103, 103', the parameters (time, intensity, etc.) of the laser applied during the second selective heating operations may be selected to cause a portion of subsurface layer 103, 103' to convert to a portion of graphitic layer 105, 105'. Alternatively, when laser 203 is applied to a portion of a layer of PMC or pitch material on a previously formed subsurface layer 103, 103', the parameters (time, intensity etc.) of the laser applied during the second selective heating operations may be selected to cause all or a portion of the layer of PMC or pitch material exposed to laser 203 to convert to a portion of graphitic layer 205. Following application of the laser 203 during the second selective heating operation to a first portion of sample 207, laser 203 may be used to perform second selective heating operations on other (e.g., second, third, fourth, etc.) portions of sample 207, until a graphitic layer 103, 103' is formed.

Like the first heating operation, the parameters used (e.g., laser application time, laser power/intensity, etc.) applied to the substrate 207 (or, more particularly, to a subsurface layer 103, 103' or overlying PMC or pitch layer thereon) during the second heating operation may be dictated or otherwise based on data obtained from simulations of heating characteristics of the materials used in substrate 101, subsurface layer(s) 103, 103', and/or the layer of PMC or pitch material thereon. Alternatively, or additionally, the parameters applied during the second heating operations may be dictated or controlled based on a sensor signal that is obtained before, during, or after execution of a second selective heating operation.

For example, and as described above in connection with the performance of first selective heating operations, monitoring system 205 may be configured to monitor sample 207 during application of laser 203 during a second selective heating operation and provide a second sensor signal to controller 201. The second sensor signal may include information that may enable the controller 201 to determine whether a desired heating profile is being applied to a surface of sample 207, i.e., whether laser 203 is being applied in such a manner as to result in the formation of a graphitic layer 105 with desired characteristics. As the way the second sensor signal is produced and provided to controller 201 is the same as described above in connection with formation of subsurface layer(s) 103, 103', such operations are not described again in detail regarding performance of the second selective heating operations used to form one or more graphitic layers 105, 105'.

Figure 3A:
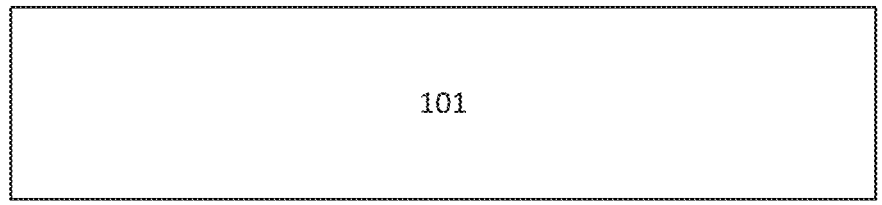
FIGS. 3A-3C are block diagrams that stepwise illustrate formation of a composite consistent with the present disclosure.
Figure 3B:
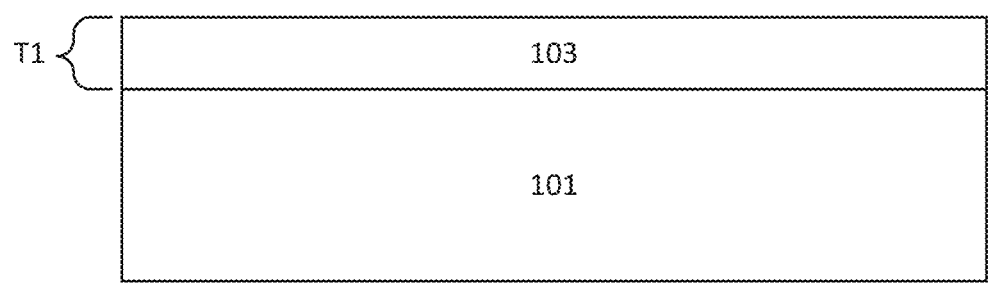
Figure 3C:
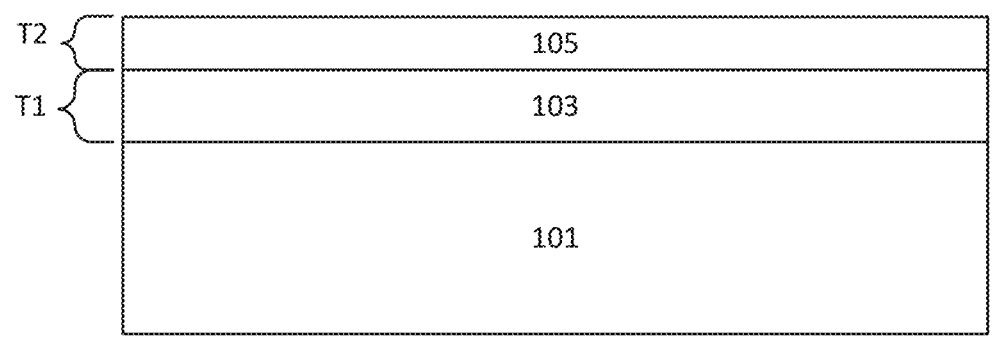

FIGS. 3A-3C are block diagrams that stepwise illustrate formation of one example of a composite consistent with the present disclosure. As shown, formation of a composite may begin with the provision of a PCM or pitch substrate 101, as discussed above. A subsurface layer 103 may then be formed on an upper surface of substrate 101 (or on a surface of an intervening layer of PCM or pitch material (not shown)), as shown in FIG. 3B. Subsurface layer 103 may be formed by the performance of first selective heating operations as described above. Such operations may be performed, for example, by system 200 or a similarly configured system. As shown in FIG. 3C, a graphitic layer 105 may then be formed on a surface of subsurface layer 103, as described above. Additional subsurface layers 103' and graphitic layers 105' may then be alternately formed on substrate 101, as shown for example in FIGS. 5A-5C.

As noted above, the parameters used during the heating operations described herein can have an impact on the structure and properties of the layers after such heat treatment. To illustrate this concept reference is made to FIGS. 11 and 12, which are Raman spectra of two different PMC samples that were subject to different laser heat treatment. The PMC samples used in this case relied upon carbon fibers derived from polyacrylonitrile in a phenolic derived polymer resin matrix. The sample of FIG. 11 was subject to treatment with 145 W/cm² of a laser light at 890 nm wavelength. Specifically, the sample was exposed to laser light emitted from a continuous wave diode laser operated at 34 W, with the sample moving relative to the laser at a rate of 10 millimeters per second (mm/s). The laser was passed multiple times over the same spot on the sample, with each pass corresponding to a treatment "cycle."

Figure 11:
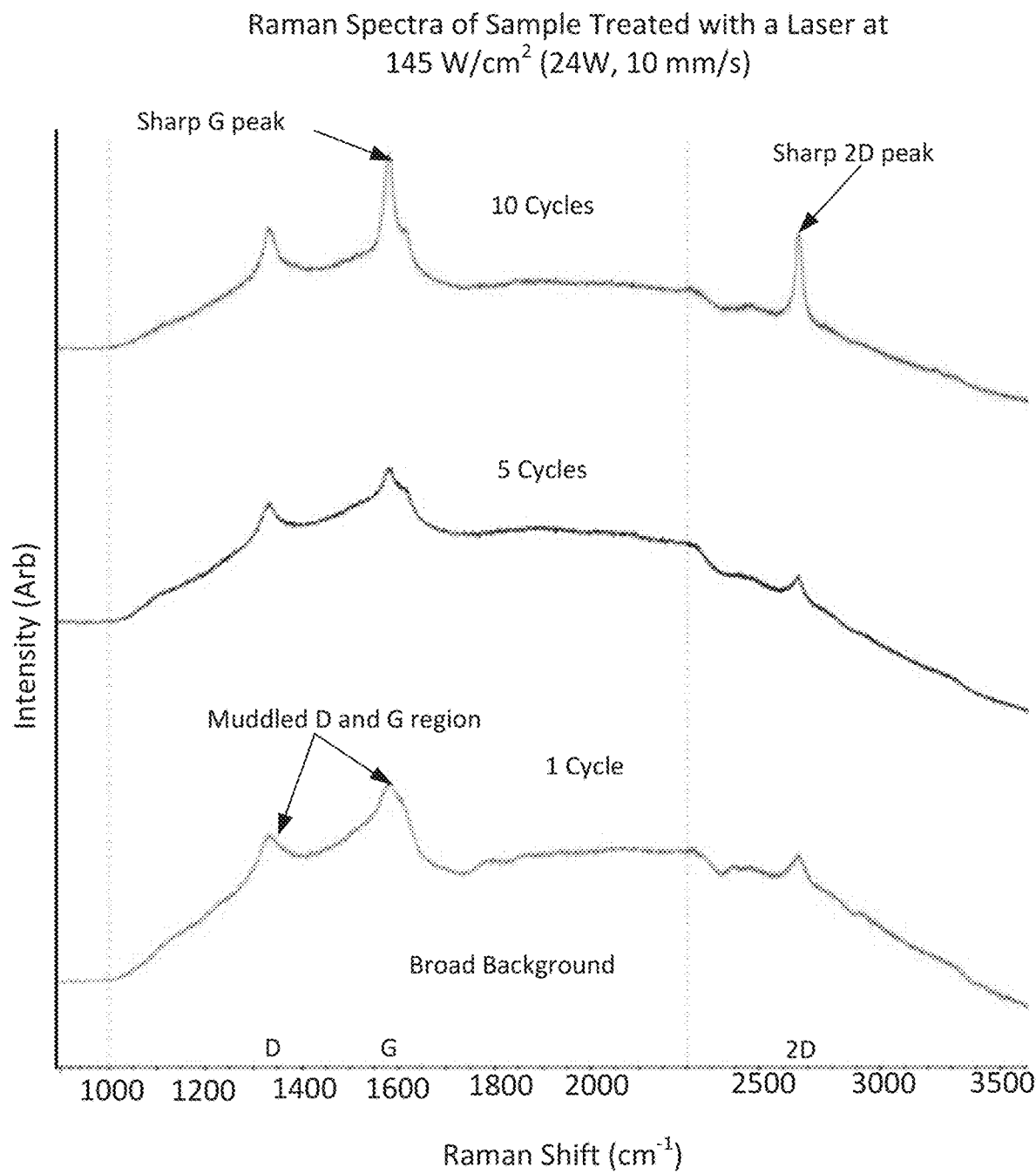
FIG. 11 is a Raman spectrum of a sample subjected to one, five, and ten cycles of heat treatment with one example of laser operating conditions.

As shown in FIG. 11, after a single cycle the Raman spectra of the sample had a broad background with a muddled D and G region, and a relatively small peak in the 2D region. After five cycles, the Raman spectra began to show limited growth and sharpening of the 2D and G peaks. And after 10 cycles, the Raman spectra showed significant sharpening of the G and 2D peaks, indicating the formation of graphitic carbon. Notably, the 2D peak after 10 cycles remained relatively small, indicating a relatively low number of defects in the sample after treatment.

Figure 12:
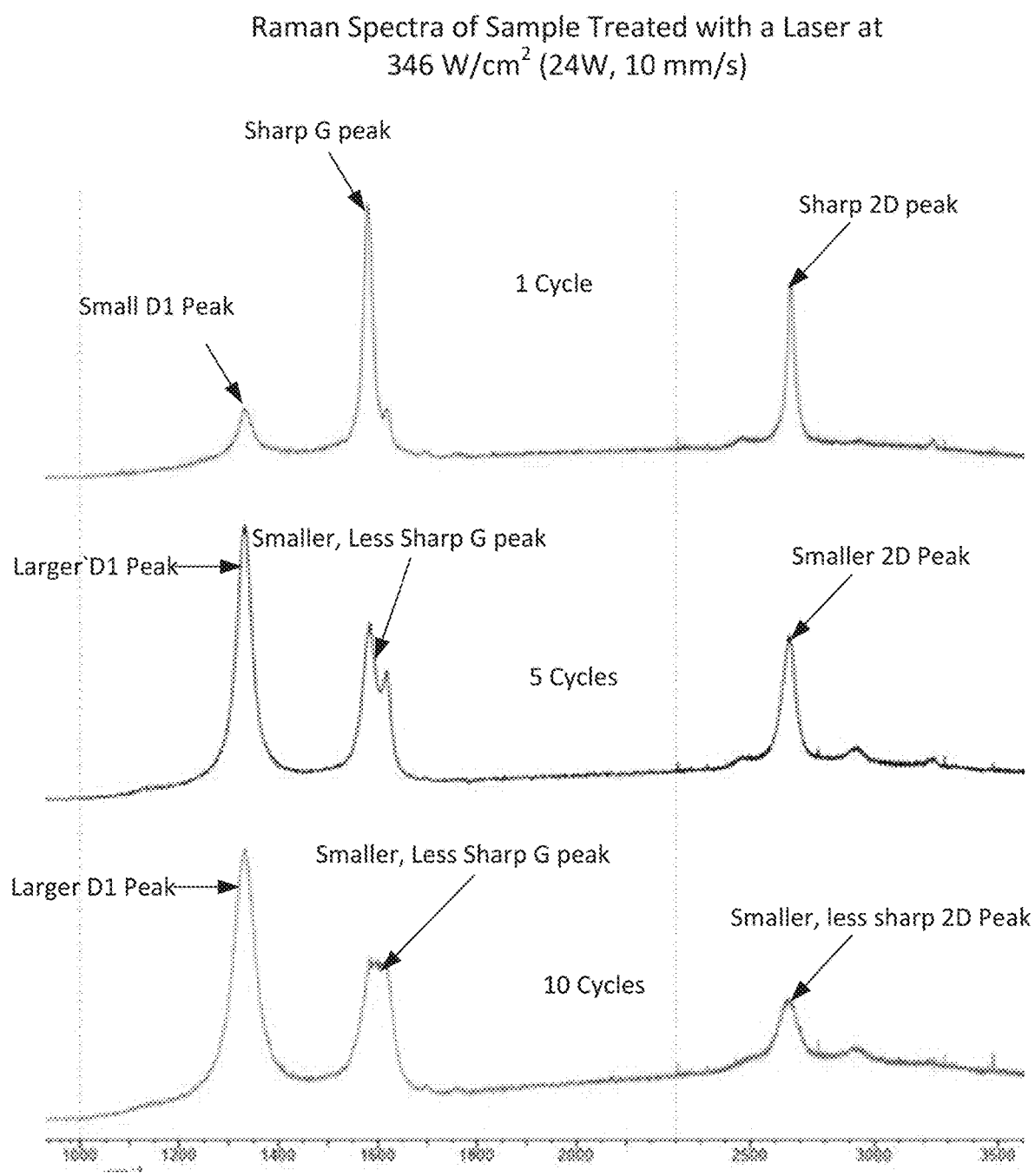
FIG. 12 is a Raman spectrum of a sample subjected to one, five, and ten cycles of heat treatment with another example of laser operating conditions.

The sample of FIG. 12 was subject to treatment with 346 W/cm² of a laser light at 890 nm wavelength. Specifically, the sample was exposed to laser light emitted from a continuous wave diode laser operated at 34 W, with the sample moving relative to the laser at a rate of 2 millimeters per second (mm/s). The laser was passed multiple times over the same spot on the sample, with each pass corresponding to a treatment "cycle." As shown in FIG. 12, after a single cycle the Raman spectra of the sample showed sharp G and 2D peaks and a relatively small D1 peak, indicating the formation of graphitic carbon with relatively few defects. After five cycles, the G peak diminished and the D1 peak became larger, signifying a transition from graphitic carbon to more disordered (e.g., amorphous) carbon. After 10 cycles, the Raman spectrum showed an even smaller and less distinct G peak, a broader D1 peak, and a smaller 2D peak relative to the spectrum after 5 and 1 cycles, further signifying progression from graphitic carbon to disordered (e.g., amorphous) carbon.

FIGS. 11 and 12 generally demonstrate that heating rate can have an impact on the preferred microstructure of the resultant material. For example, FIG. 12 demonstrates that relatively slow heating of a PMC material can produce graphitic layers with comparatively few defects (as evidenced by a small D1 peak and well-defined G and 2D peaks), albeit at the cost of time. In contrast, FIG. 13 demonstrates that graphitic layers with few defects may be formed relatively rapidly with more intense exposure to laser light. However, care must be taken not to over-expose the sample to the laser light, else the treatment may tend to form disordered (e.g., amorphous) carbon rather than graphitic carbon.

More specifically, and as noted above, treatment parameters such as laser power level (photon density), residence time, pass rate (which may also be understood as raster rate), hatch (the degree of overlap with a previously treated spot), etc. may impact the microstructure and properties of a material following exposure to the laser. In embodiments, the laser used in the heat treatment has a preferred power level ranging from greater than or equal 20 watts/cm² to 650 watts/cm² where such power is measured at the center of laser spot (1.0 mm beam diameter).

In general, as the laser power level increases, the rate at which the layer is heated increases. With that in mind, as a PMC material is heated by a laser, the polymeric component therein may pyrolyze or otherwise convert to carbon or carbonaceous material. The structures resulting from such conversion may depend on the temperature to which the material is heated, as described elsewhere in this application. During such conversion, gas may evolve from the material, with the rate of gas evolution dependent on the heating rate. That is, when the PMC material is rapidly heated (i.e., as laser power level increases) the rate at which gas is evolved during the conversion of the PMC material to carbon/carbonaceous material increases.

Figure 13:
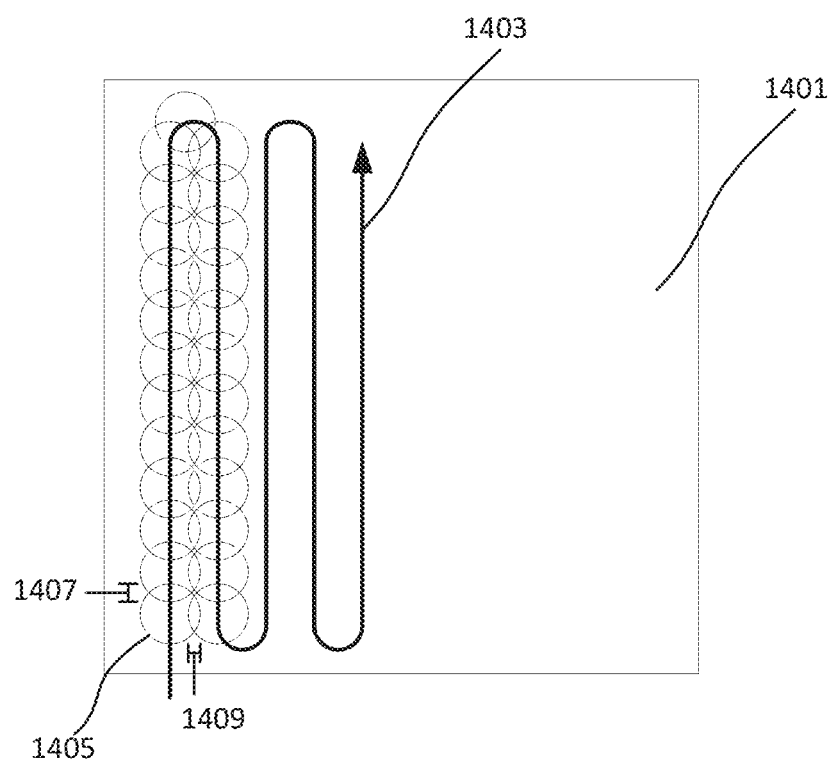
FIG. 13 is a schematic diagram showing one example of a raster pattern and laser spot hatch consistent with the present disclosure.

The residence time of the laser on a part of the PMC material can also impact the structure and properties of the resultant material. For example, as residence time increases (i.e., as raster rate decreases), the amount of time the laser is focused on a particular spot sample increases. As shown in FIG. 13, a sample 1401 (e.g., of PMC material) may be exposed to a laser that is moving in a raster pattern 1403 over the surface of the sample. The longer the laser is focused on a particular spot, the more that spot will be heated. Thus, it is preferable herein to control the residence time of a laser on points of a layer to be treated. In embodiments, the systems and methods described herein are configured such that during a heat treatment process, the laser is present one or more points on the layer undergoing treatment for 67 milliseconds seconds to 300 milliseconds. More preferably 100 milliseconds to 200 milliseconds.

The spot size of the laser can also impact the rate at which the surface of a layer is heated and, potentially, the resultant properties and structure thereof. For example and as shown in FIG. 13, a laser with a spot size 1405 may be used to heat treat the surface of sample 1401, e.g., by moving the laser relative to the surface of the sample 1401 along a raster patter 1403. At a constant laser power, the photon density of the spot decreases as the spot size of the laser increases, and vice versa. Accordingly, the photon density of the laser may be increased by reducing its spot size, resulting in a corresponding increase in the heating rate of the area exposed to the spot. It may therefore be desirable to control the spot size of the laser (either alone or in combination with other factors such as laser power) to control the rate at which the surface of a sample is treated and potentially the maximum temperature to which the material is heated for the reasons noted above. In embodiments, the preferred laser spot size range diameter from 0.5 mm to 5.0 mm, which spot size impinges upon the substrate.

The hatch of the laser (i.e., the degree to which the spot of the laser overlaps with a previously treated spot can also impact the heat treatment applied to the sample. For example, and as shown in FIG. 13, as a laser is moved along a raster pattern 1403, the laser spot 1405 may be repositioned relative to the sample 1401. When the spot 1405 of the laser is moved from a first location to a second location on the sample 1401, the spot 1405 may remain incident on at least a portion of the first location. As a result, the residence time of the spot on that portion of the first location may be increased (relative to the residence time of the spot at other parts of the first location), locally changing the heat treatment at that location. This can result in material changes in the heat treatment at the locations at which the spot of the laser overlaps. While this effect could be limited or eliminated by eliminating overlap of the laser on adjacent spots in the raster pattern, doing so may cause spot 1405 not to be incident on at least some portions of sample 1401, which may also affect the heat treatment thereof. Accordingly, it may be desirable to control the degree of hatch (overlap) between adjacent spots of the laser during a heat treatment cycle. As shown in FIG. 13, when a laser is moved in a snake pattern over the surface of sample 1401, the spot 1405 may overlap with an adjacent spot as it is moved vertically along the surface (as represented by vertical hatch 1407). Likewise, the spot 1405 may overlap with previously treated spots in an adjacent row (as represented by horizontal hatch 1409). The degree of hatch may be quantified as the amount, in percent, that a second spot overlaps with an adjacent (first) spot. E.g., the hatch may be determined using the equation $H=(S_o/S1)*100\%$, where S1 is the total area of a first spot, and $S_o$ is the area of the second spot that overlaps with the first spot. In embodiments, the hatch of the laser ranges from greater than or equal to 0 to about 20.0%.

For the sake of illustration FIG. 13 depicts the use of a snake-like raster pattern 1403 in which laser spot 1405 moves vertically over sample 1401 in a first column, after which it is moved laterally and then vertically over the sample in a second column. This process repeats until the desired area of sample 1401 is treated with the laser. While such a raster pattern is useful, the systems and methods are not limited thereto any suitable raster pattern may be used.

For example, raster pattern 1403 could be configured such that the laser spot 1405 move laterally over sample 1401 in a first row, after which it is moved vertically and then laterally over sample 1401 in a second row, and so on. Other patterns and/or applications of laser spot 1405 may also be useful.

Figure 4:
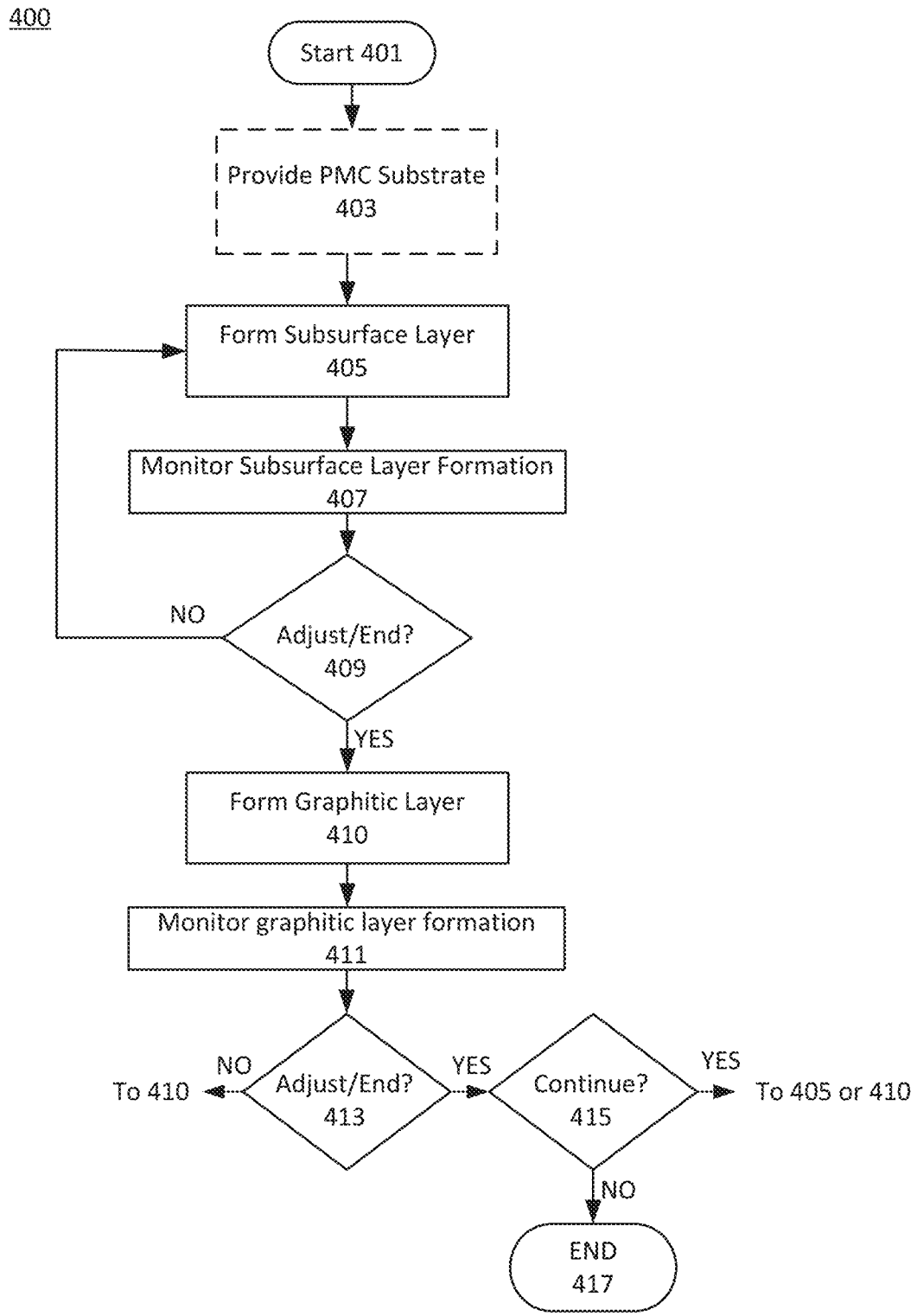
FIG. 4 is a flow diagram of example operations of one example of a method of forming a C/C composite consistent with the present disclosure.

FIG. 4 is a flow chart of example operations of one example of a method of forming a composite consistent with the present disclosure, on a preferred PMC substrate. As shown, method 400 begins at block 401. The method may then proceed to optional block 403, pursuant to which a substrate may optionally be provided. Provision of the substrate may involve, for example, infiltrating a carbon fiber with an impregnant, such as but not limited to a polymer resin as discussed above. The substrate may optionally include a discrete layer of PMC material thereon, e.g., for full or partial conversion to a subsurface layer.

Once a substrate has been provided or if the operations of block 403 are omitted (e.g., when substrate is provided and/or purchased separately), the method may proceed to block 405, pursuant to which a subsurface layer may be formed. The operations of block 405 may include selectively applying a laser to a surface of the substrate in accordance with first selective heating operations as discussed above. Application of the laser may be applied in a rasterized or other suitable fashion over a surface of the sample. During or following formation of a subsurface layer on all or a portion of the substrate (or an overlying PMC layer), the method may proceed to block 407, pursuant to which formation of the subsurface layer may be monitored. Operations pursuant to block 407 may include monitoring the sample being processed with one or more sensors or sensing instruments, as discussed above. For example, operations pursuant to block 407 may include monitoring a sample during or after application of a laser in accordance with first heating operations with a sensor or sensor instrument and providing a first sensor signal to a controller. The operations may further include determining, with the controller, whether the measured data included in the first sensor signal is in accordance with target data or differs from target data by a threshold amount, as discussed above.

The method may then proceed to block 409, pursuant to which a determination may be made as to whether formation of the subsurface layer is complete and, if not, whether the operating parameters for the first selective heating operations are acceptable, or if they should be adjusted. The outcome of block 409 may be conditioned on a determination (e.g., by a controller), of whether formation of the subsurface layer is complete and, if not, on whether measured data obtained pursuant to block 407 is in accordance with or differs from target data as discussed above. If the measured data differs from the target data by more than a threshold amount and formation of the subsurface layer is not complete, the outcome of block 409 is NO and the method may loop back to block 405—after which the operating parameters applied during the first selective heating operations may be adjusted and the laser is used to perform first selective heating operations (with modified parameters) on another portion of the sample. Similarly, if the measured data is in accordance with the target data and the formation of the subsurface layer is not complete, the method may loop back to block 405—pursuant to which first selective heating operations may be performed on (without modification) another portion of the sample. Finally, if the formation of the subsurface layer is complete, the method may proceed from block 409 to block 410.

When the outcome of block 409 is YES the method may proceed to block 410, pursuant to which a graphitic layer 105 may be formed on and/or from an underlying subsurface layer 103. Alternatively, a graphitic layer 105 may be formed on and/or from a layer of PMC material on subsurface layer 103. Operations of block 410 may involve performance of second selective heating operations on the sample under consideration, as discussed above. For example, such second selective heating operations may include applying a laser to a portion of an underlying subsurface layer 103 for a time and at an intensity/power sufficient to convert a portion of the subsurface layer 103 to a graphitic layer 105. Alternatively, such second selective heating operations may include applying a laser to a portion of a PMC layer on an underlying subsurface layer 103, for a time and at an intensity/power sufficient to convert all or a portion of the 1 PMC layer to a graphitic layer 105 as discussed above.

During or following formation of a graphitic layer on all or a portion of a subsurface layer (or an overlying preferred PMC layer) the method may proceed to block 411, pursuant to which formation of the graphitic layer may be monitored. Operations pursuant to block 411 may include monitoring the formation of the graphitic layer with one or more sensors or sensing instruments, as discussed above. For example, operations pursuant to block 411 may include monitoring, with a sensor or other instrument, formation of the graphitic layer during or after application of a laser in accordance with second selective heating operations, and providing a sensor signal to a controller. The operations may further include determining, with the controller, whether the measured data included in the second sensor signal is in accordance with target data or differs from target data by a threshold amount, as discussed above.

The method may then proceed to block 413, pursuant to which a determination may be made as to whether operating parameters for the second selective heating operations are acceptable, or if they should be adjusted. The outcome of block 413 may be conditioned on a determination (e.g., by a controller), of whether the formation of a graphitic layer is complete and, if not, whether measured data obtained pursuant to block 410 is in accordance with or differs from target data as discussed above. If the measured data differs from the target data by more than a threshold amount and formation of the graphitic layer is not complete, the outcome of block 413 is NO and the method may loop back to block 410—after which the operating parameters applied during the first selective heating operations may be adjusted and the laser is used to perform first selective heating operations (with modified parameters) on another portion of the sample. Similarly, if the measured data is in accordance with the target data and the formation of the graphitic layer is not complete, the method may loop back to block 410—pursuant to which additional second selective heating operations may be performed (without modification) on another portion of the sample. Finally, if the formation of the graphitic layer is complete, the method may proceed from block 413 to block 415.

Pursuant to block 415 a determination may be made as to whether the method is to continue. The outcome of block 415 may be conditioned on whether additional subsurface and/or graphitic layers are to be formed. If an additional layer is to be formed the outcome of block 415 is YES and the method may loop back to block 405 or block 410. For example, and as shown in FIG. 5, additional subsurface layers 103' and graphitic layers 105' may be alternatively formed on substrate 101. If the outcome of block 415 is NO, however, the method may proceed to block 417 and end.

Figure 6:
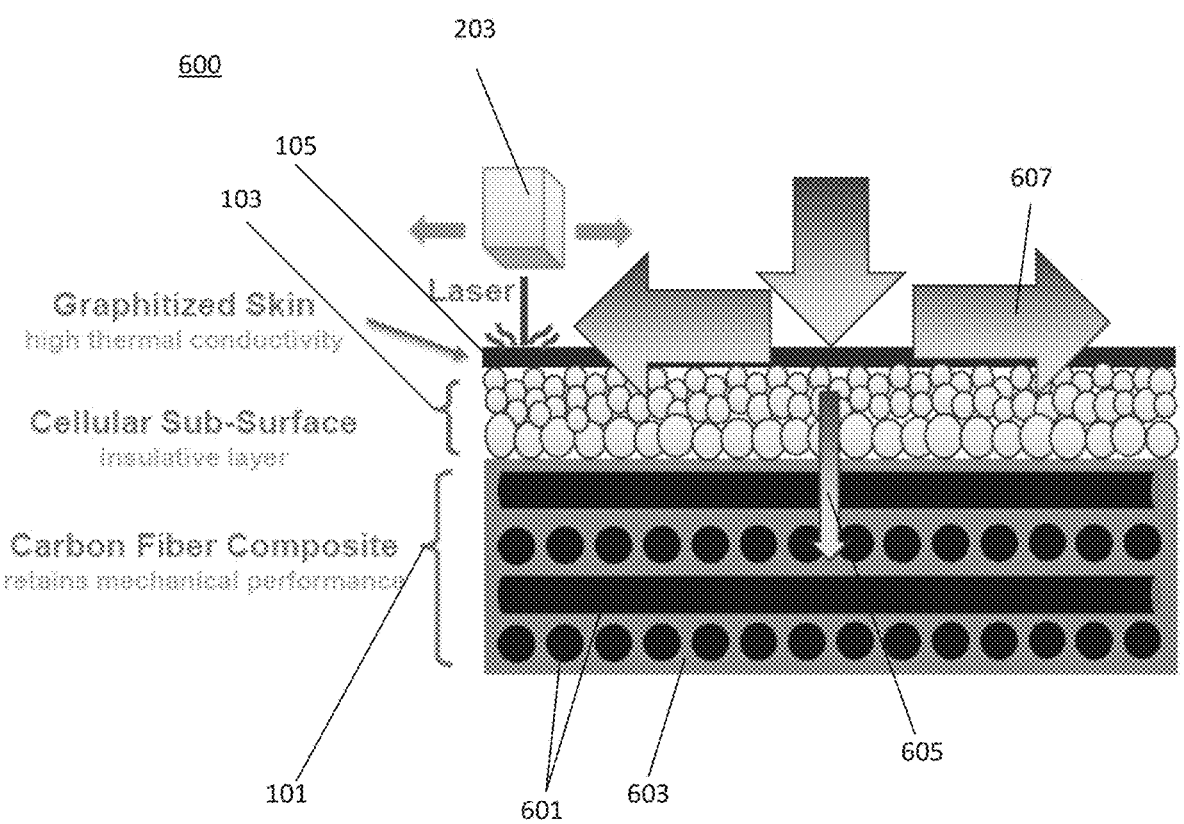
FIG. 6. is a stylized cross-sectional diagram of one example of a composite consistent with the present disclosure and a method of forming the same.

FIG. 6 is a representative cross-sectional view of a preferred composite consistent with the present disclosure. As shown, composite 600 includes substrate 101 that preferably includes a carbon fibers 601 impregnated with a resin 603, e.g., a phenolic resin. As can also now be seen in FIG. 6, laser 203 (controlled by controller 201 or, more specifically, selective heating module (SHM) 206)) has been used to perform first selective heating operations on a surface of substrate 101, resulting in the formation of a subsurface layer 103 with a cellular (e.g., foamed) structure having pores preferably in the range of greater than 0 to about 150 µm.

As further depicted in FIG. 6, laser 203 (controlled by controller 201 or, more specifically, SHM 206) is in the process of performing second selected heating operations on a surface of subsurface layer 103, thereby converting at least a portion of subsurface layer 103 into a graphitic layer 105. As noted herein, the subsurface layer 103, due at least in part to its microstructure, has a relatively low thermal conductivity in a thickness direction of composite 600, as depicted by the relatively small arrow 605. That is, subsurface layer 103 has a thermal conductivity perpendicular in thickness of less than or equal to about 5.0 Watts per meter per Kelvin. In contrast, graphitic layer 105, which overlies all or a portion of subsurface layer 103, and which also defines a graphitized skin surface, has a relatively large thermal conductivity in a direction parallel to an upper most surface of composite 600, as depicted by the relatively large arrow 607. That is, graphitized layer 105 as illustrated in FIG. 6 indicates a thermal conductivity parallel to the surface of the graphitized layer that preferably falls in the range of about 10 Watts per meter per Kelvin to about 600 Watts per meter per Kelvin.

As discussed above, the operational parameters applied during the formation of subsurface layers and graphitic layers can have an impact on the physical structure and properties of such layers. As a result, it can be preferable to control such operational parameters during formation of a subsurface and/or graphitic layer to produce a composite with desired properties. In that regard, laser power, laser application time (e.g., stepping/raster rate), and peak temperature are examples of operational parameters that may have an impact on the microstructure and properties of the composites formed herein.

The systems and method described herein can therefore preferably be configured to control the operational parameters of a laser applied during a selective heating operation to achieve a subsurface or graphite layer with desired properties. Such adjustment capability may allow the systems and methods to react to variances in the performance and thermal properties of the PMC material used as substrate 101, and/or the properties of the resultant subsurface and/or graphite layers.

In preferred embodiments and as noted above the systems and methods described herein may monitor formation of a subsurface or graphitic layer with a thermal sensor, such as an infrared camera or a pyrometer. For example, a thermal camera may be used to monitor formation of a subsurface or graphitic layer and produce a measured thermal image that can be sent to a controller for evaluation.

One example of such a thermal image is shown in the left hand side of FIG. 7. In response, the controller may compare the measured thermal image to a simulated thermal image obtained from simulation of the thermal performance of the materials used in the composite. One example of such a simulated thermal image is the right-side image of FIG. 7. Based on a comparison of the simulated and measured images, the controller may determine whether the thermal profile applied during the selective heating operation is correct or requires adjustment, as discussed above. If adjustment is needed, such adjustment may be made before the subsequent performance of additional selective heating operations on the same sample, or before performance of such operations on another sample.

Alternatively, or additionally, the systems and methods described herein may use spectroscopy to monitor formation of a subsurface or graphitic layer. For example, the systems and methods described herein may use a Raman spectrometer to monitor formation of a subsurface or graphitic layer. The Raman spectrometer may produce a measured Raman spectra of a sample under consideration for conveyance to a controller. As discussed above, the controller may determine whether the operational parameters applied during formation of the layer in question are appropriate based on a comparison of the measured Raman spectrum to a target Raman spectrum.

Figure 8A:
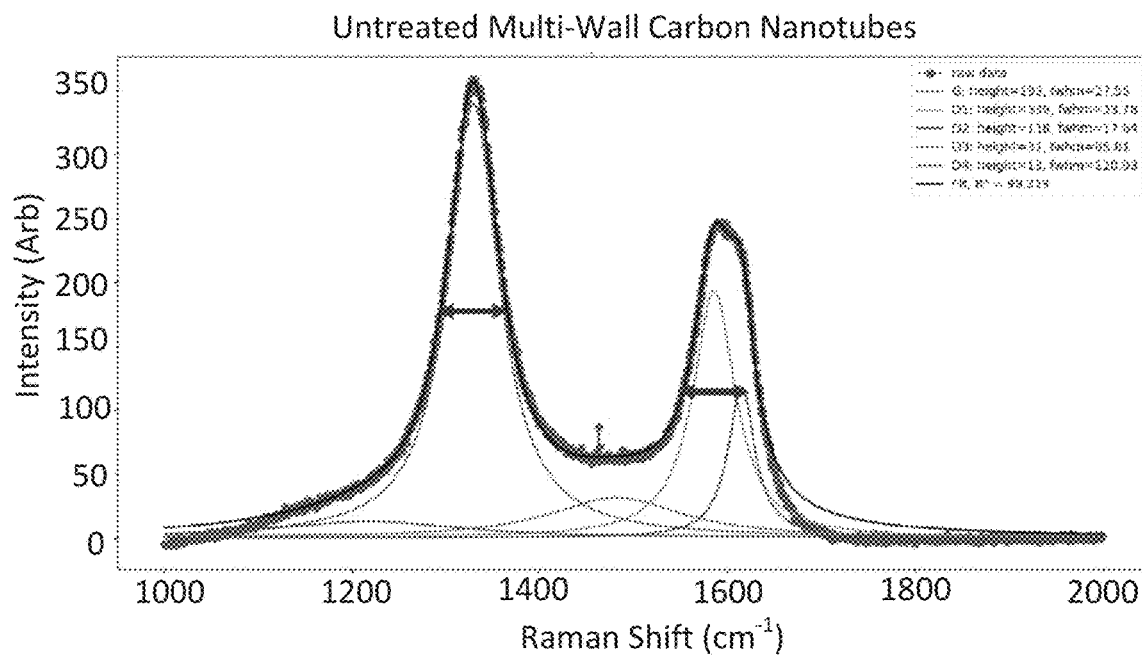
FIG. 8A is an example Raman spectrum of an untreated composite.
Figure 8B:
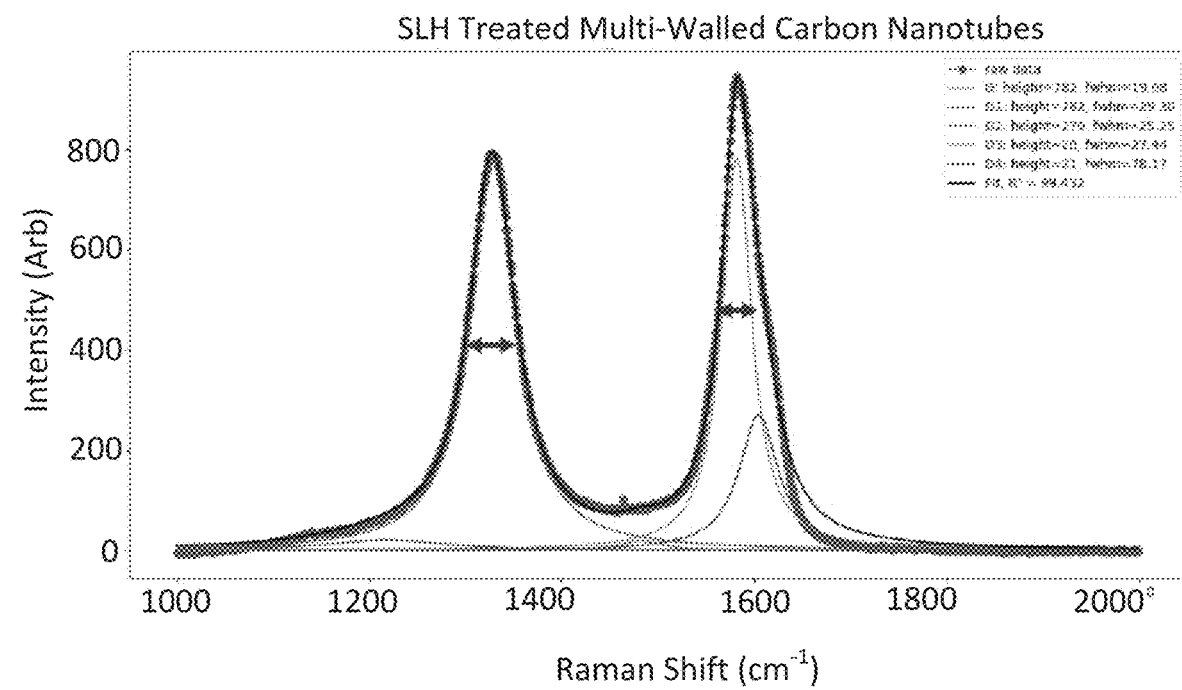
FIG. 8B is an example Raman spectrum of an example composite consistent with the present disclosure.

In that regard reference is made to FIGS. 8A and 8B, which are example Raman spectra of an untreated multi-walled carbon nanotubes (FIG. 8A) and multiwalled carbon nanotubes that have been treated with selective laser heating operations (FIG. 8B) as described above. As can be seen from FIG. 8B, the multi-walled carbon nanotubes that were subject to the selective laser heating operations had a higher graphite content, as demonstrated by their G/D1 ratio (i.e., the ratio of the peak intensity of the G and D1 peaks)), relative to the spectrum of the untreated multi walled carbon nanotubes shown in FIG. 8A.

The composites described herein may also be characterized by their physical microstructure. For example, one or more of the layers of the composites described herein (and particularly the subsurface layers) may include a cellular microstructure which is observable by cross-sectional scanning electron microscopy through an opening in the composite formed by ion milling. This feature is shown in FIGS. 9A-9D, which are SEM images of example composites consistent with the present disclosure.

Figure 9A:
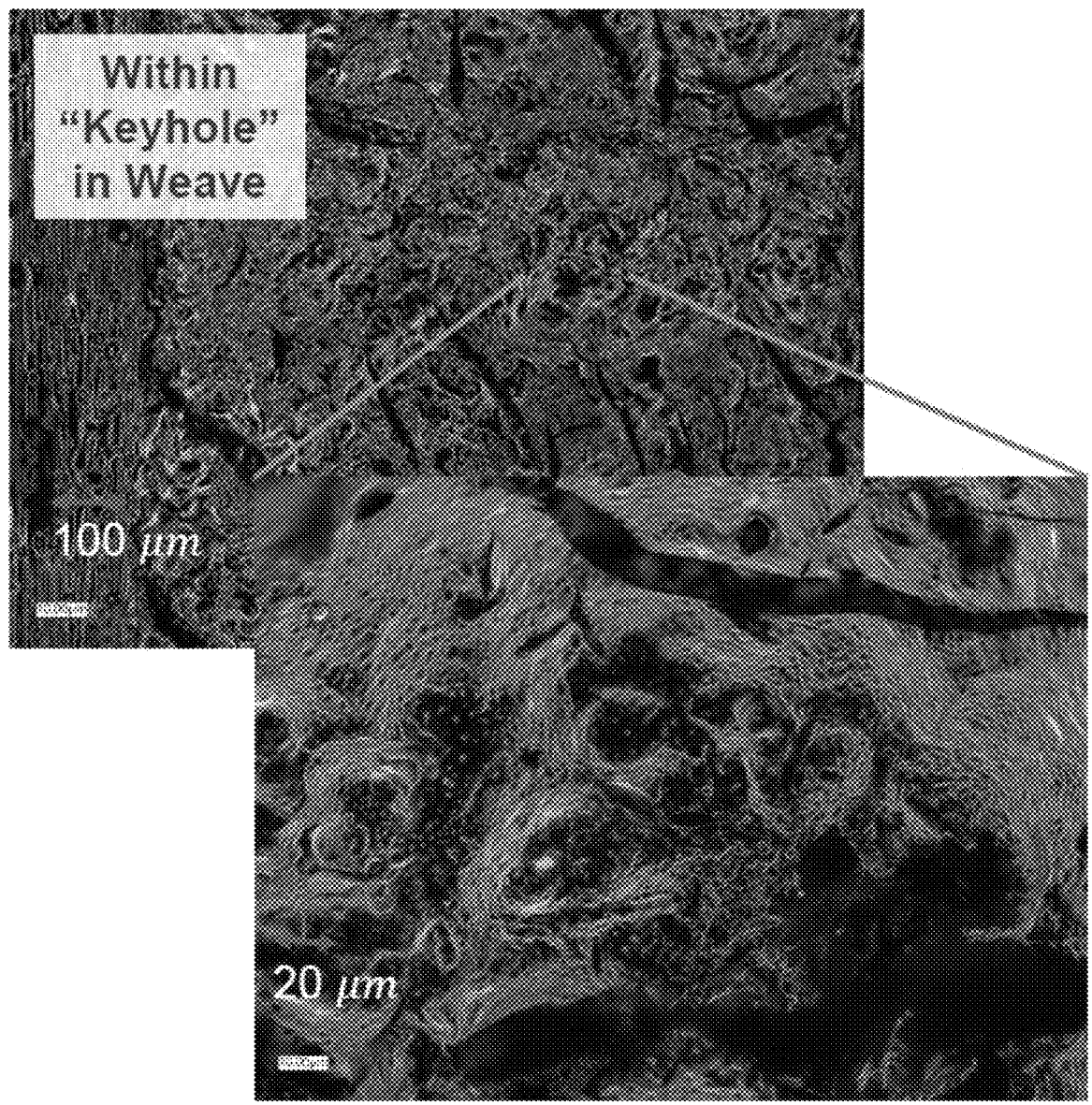
FIG. 9A is a scanning electron microscope image of a structure of a graphite layer of a composite consistent with the present disclosure.
Figure 9B:
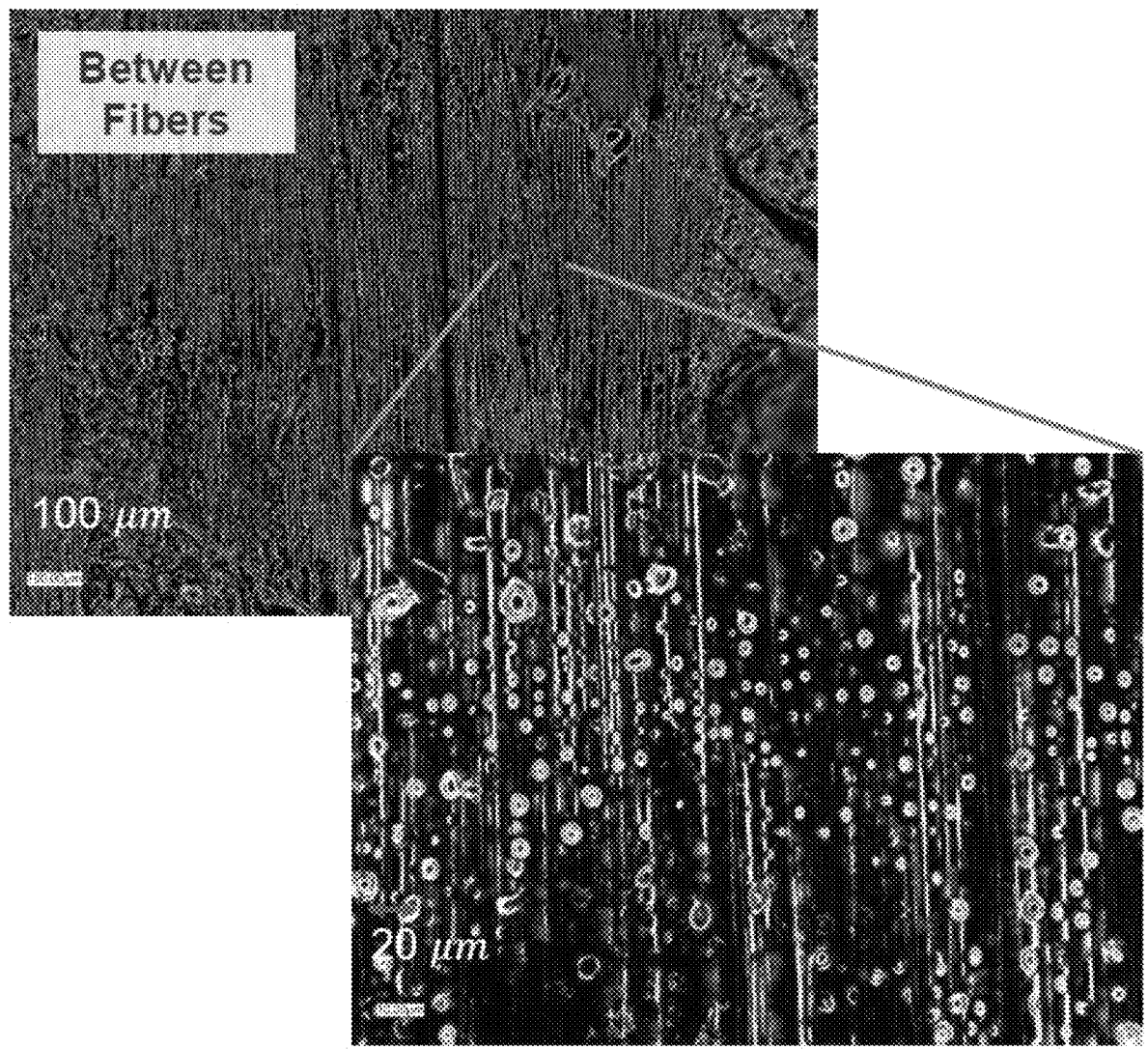
FIG. 9B is a scanning electron microscope image of a structure of a cellular subsurface layer of a composite consistent with the present disclosure.
Figure 9C:
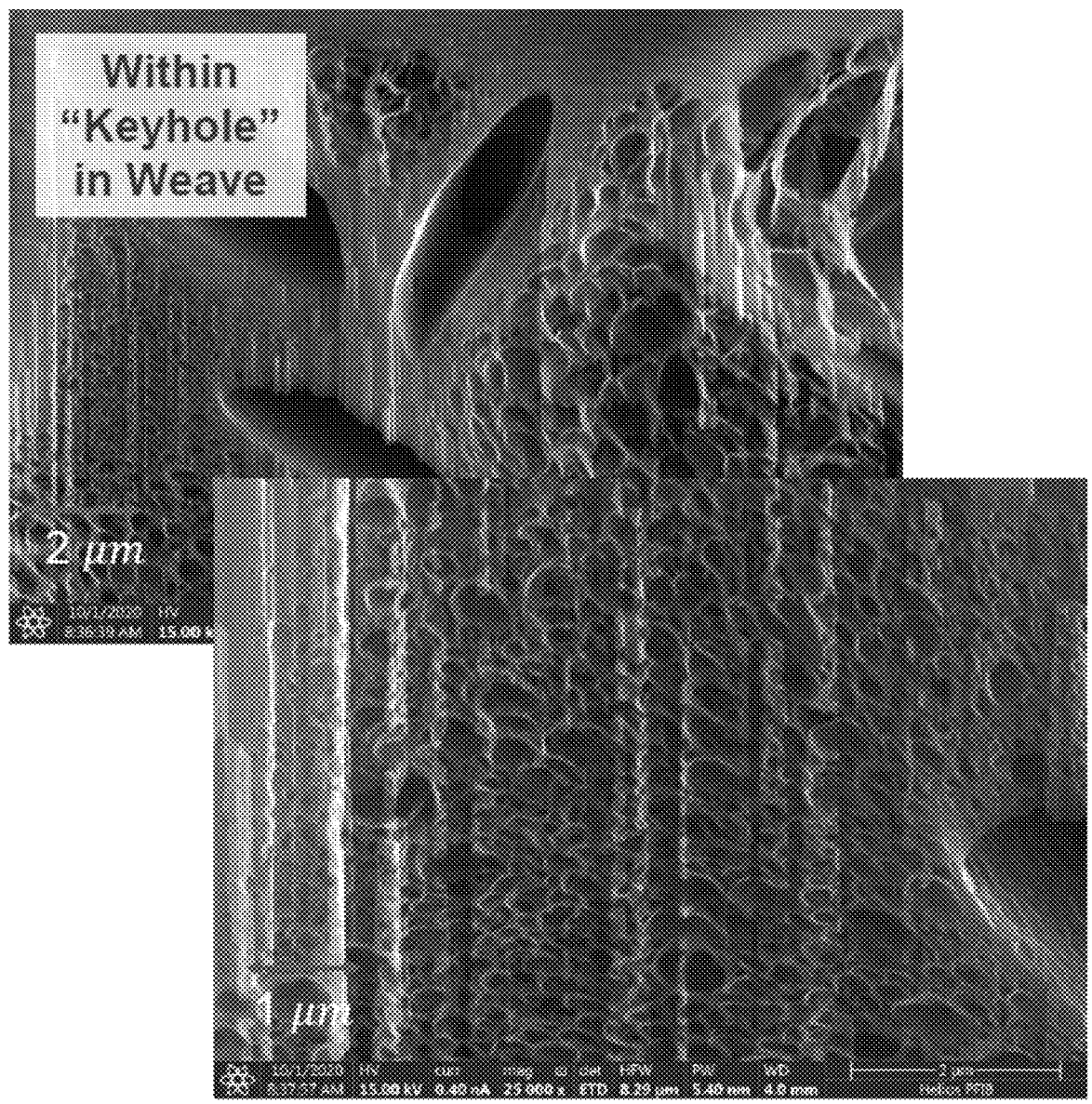
FIG. 9C is another scanning electron microscope image of a structure of a cellular subsurface layer of a composite consistent with the present disclosure.
Figure 9D:
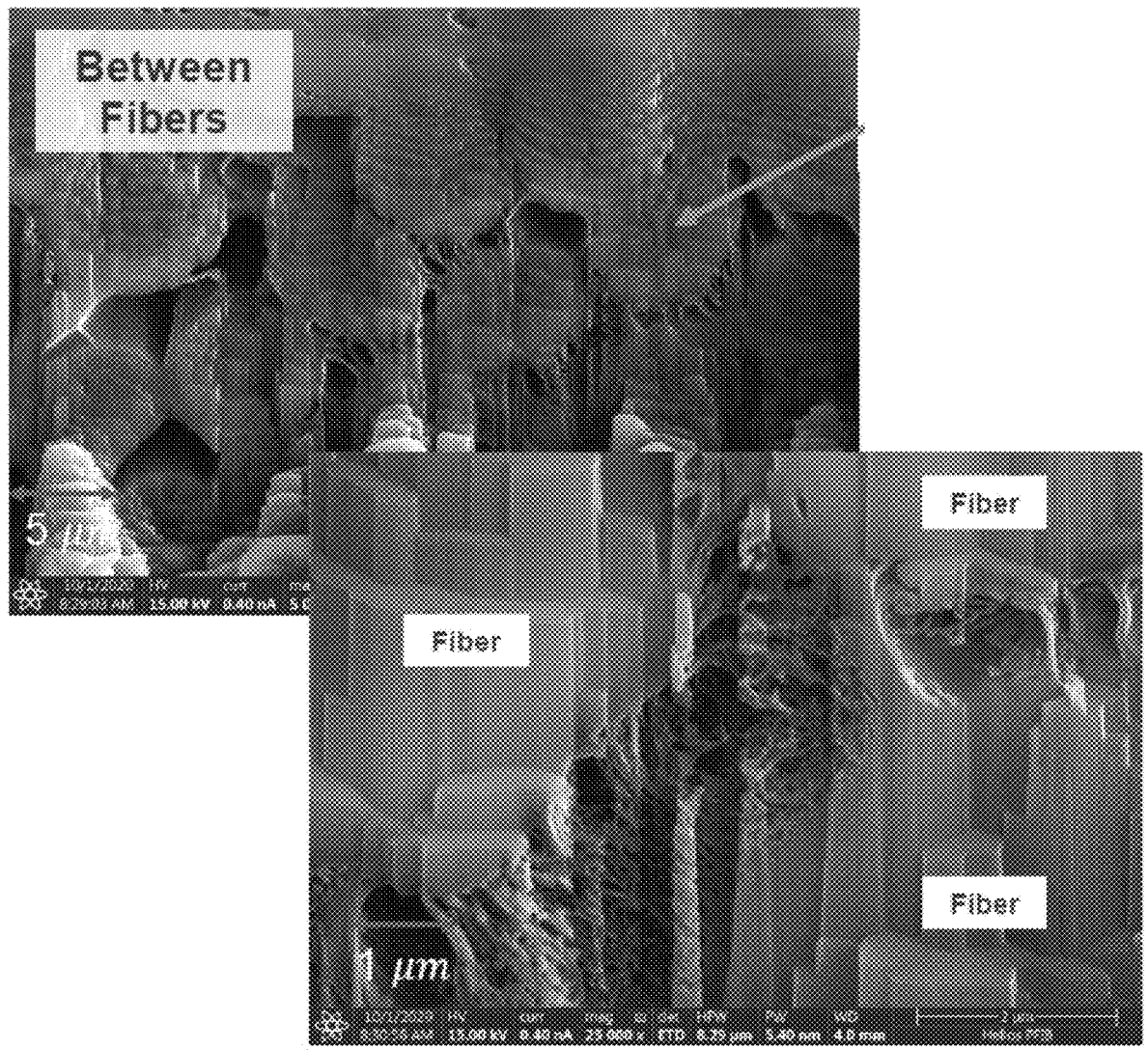
FIG. 9D is another scanning electron microscope image of a structure of a graphitic layer of a composite consistent with the present disclosure.

As shown in FIGS. 9A-9C for example, the subsurface layers of the composites described herein may include relatively small cells with an average size on the order of greater than 0 to about 150 µm, such as from greater than 0 to about 50 µm, or even from about 10 to about 40 µm. Put differently, such layers may exhibit a porous structure with pores with an average pore size of greater than 0 to about 150 µm, such as greater than 50 µm. In contrast, the graphitic top layers may include a more highly crystalline structure, as shown in FIG. 9D.

The composites described herein (see again FIG. 1) may be characterized by their desirable thermal performance, as may be measured by subjecting the composite to direct radiative ablation with gaussian optical node (DRAGON) testing. During such evaluation, part of a sample of composite may be exposed to a laser that is focused to a relatively small diameter (e.g., 4 mm or less). The laser is applied for a set time period (e.g., 1-10 minutes, e.g., 5 minutes), heating the point at which the sample is exposed to the laser to a temperature that is designed to emulate a use condition of the composite. For example, DRAGON testing may involve using a laser to heat a point of the C/C sample to a temperature more than 1500° C., 2000° C., or even 3000° C. for a period in a range of greater than 0 to about 10 minutes or more. Such testing may be performed in situ (e.g., with the system 200 used to form subsurface layers 103, 103' and graphitic layers 105, 105') or by another suitably equipped system. Performance of the C/C composite may be evaluated by the amount of sample that was ablated and/or recessed by exposure to the laser. Samples with poorer thermal resistance may be identified by a relatively large amount of ablation and/or recession, which may be observed through a reduction of material and or increase in surface roughness. Samples with better thermal resistance, in contrast, may exhibit less ablation and/or recessing following exposure to the laser.

Figure 10A:
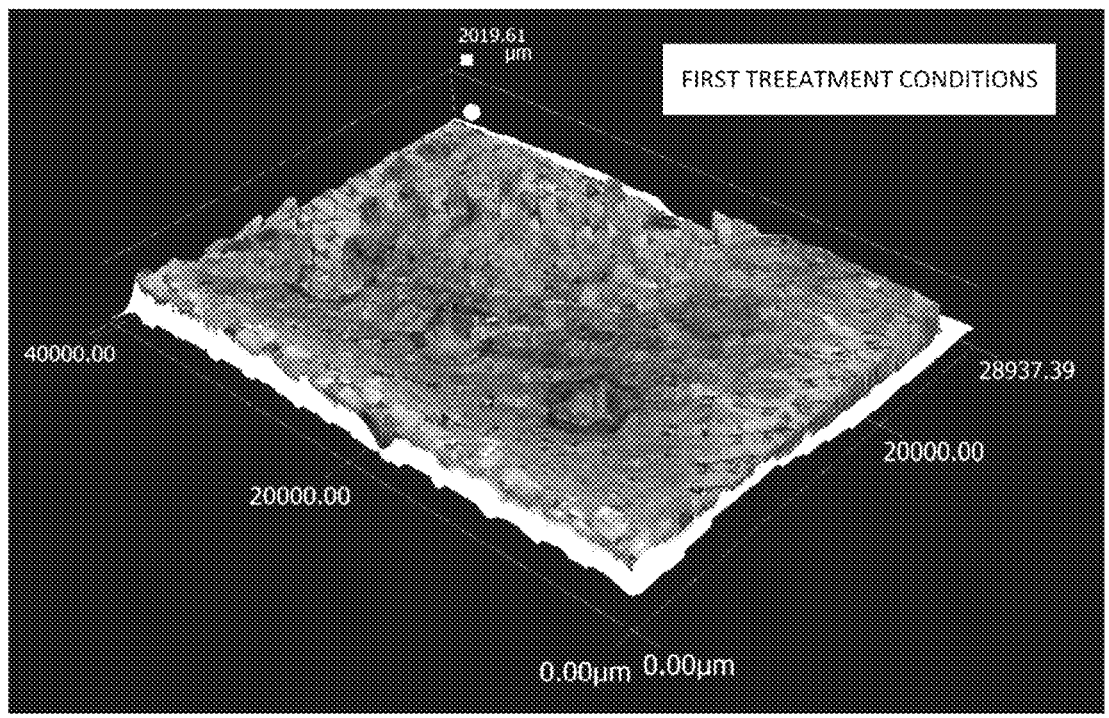
FIG. 10A is an image of a surface of sample composite formed under a first set of conditions, following ablation testing.
Figure 10B:
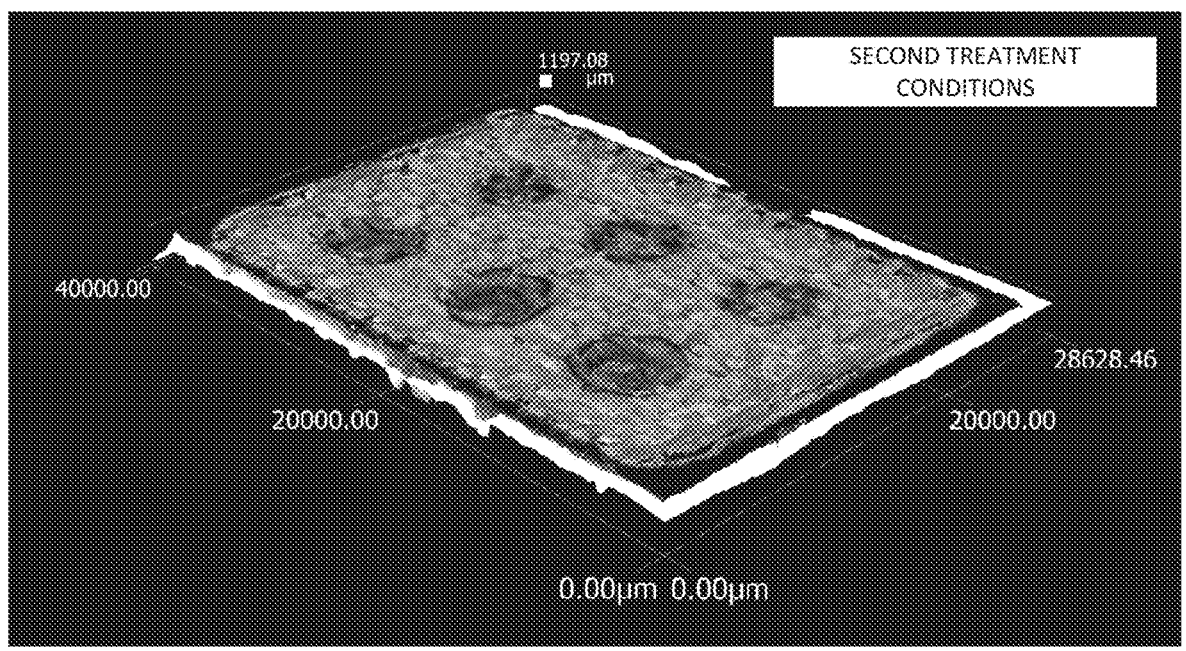
FIG. 10B is an image of a surface of sample composite formed under a second set of conditions, following ablation testing.

This can be seen by comparison of FIGS. 10A and 10B, which are atomic force microscope (AFM) images of a surface the composites consistent with the present disclosure which were produced using different operating parameters during performance of the first and second selective heating operations discussed above. As can be seen by comparison of FIGS. 10A and 10B, improper selection of operational parameters during the first and/or second selective heating operations can result in composites herein that have significantly different thermal resistance properties. With that in mind, in embodiments monitoring system 203 may include a DRAGON ablation system that may provide AFM or other measured data to controller 201, e.g., for use in evaluating whether operating parameters applied during the first and second selective heat treatment operations are suitable or should be adjusted.

As may be appreciated, the systems and methods described herein provide a flexible approach to forming the composites herein that may be adjusted on the fly or on a part-by-part basis based on a comparison of measured data to target data obtained from a known acceptable sample or a simulation. As the application of laser energy to the sample will vary to some degree based on material properties, the systems and methods described herein can enable adjustment and correction for variances on a sample by sample (or even intra sample basis), allowing for one to attain a composite with thermal resistance properties that are tuned to a specific application.

With the foregoing in mind, another aspect of the present disclosure relates to technologies for making the composite structures herein using additive manufacturing, which may also be referred to as three-dimensional (3D) printing, where there is layer-by-layer build-up of the composite herein. More particularly and as will be described below, aspects of the present disclosure relate to systems and methods for forming composite structures herein, containing a substrate 101, subsurface layer 103 and graphitic layer 105, using additive manufacturing. In general, the systems and methods utilize a print head to deposit a precursor material on stage or other substrate. As used herein, "print head" is used to refer to any device or technique that deposits or creates material on a surface (e.g., of a stage or substrate) in a controller manner.

The precursor material may again be a material that is capable of undergoing thermally activated microstructural changes as discussed herein, to form one or more layer(s) 103 and then one or more layer(s) 105. The precursor material may then again be a polymer matrix composite material including additives such as carbon fibers, single and/or multi-walled carbon nanotubes (CNT), graphene, graphene oxide (GO), reduced graphene oxide (RGO), carbon black (CB), boron nitride nanotubes (BNNT). Preferably, the level of polymer matrix resin in the PMC is present at a level in the range of 20.0% (wt.) to 80.0% (wt.) and the level of additive is present in the corresponding range of 80.0% (wt.) to 20.0%. In addition, the precursor material for additive manufacturing may also comprise pitch.

In any case, the print head may deposit a layer the precursor material on the stage and along a deposition path. The stage itself may be any suitable supporting layer, which may, e.g., preferably include ceramic material, reinforced polymer, metallic material. Such support material may then optionally serve as a supporting layer of the composite part provided herein.

As used herein the terms "path" and "layer" are interchangeably utilized to refer to a layer of material deposited by a print head. The term "working layer" is used to refer to a path that is currently being deposited by a print head. In contrast, the phrase "previously deposited layer(s)," "previous layer(s)" and "previous path(s)" refer to paths/layers that were previously deposited by a print head. With that in mind, the term "machine direction" refers to the direction along which layers (and in particular working layers) are deposited by the print head.

Following deposition of a working layer of precursor material, the working layer may optionally be compressed. Following compression or if compression is omitted, the working layer may be heat treated with a laser to convert the layer of precursor material (or a portion thereof) to a cellular subsurface layer, as discussed herein, containing graphite (i.e. a graphitized foam cellular material).

The way the layer of precursor material is treated with the laser is the same as described above in connection with FIGS. 1-8A. As discussed above, the parameters of the laser (e.g., power, spot size, residence time, hatch, etc.) may be selected such that the resulting subsurface layer has a desired microstructure and/or properties.

Heat treatment with the laser may be performed after the formation of an entire working layer, or "in line" i.e., as the working layer is being deposited by a print head. For example, in embodiments the systems and methods described herein utilize a print head to form an entire working layer on the surface of a stage or a previously deposited layer. This may be done by depositing the precursor material on the stage, or a previously deposited layer as the stage and/or print head are moved relative to one another along a deposition path. Following formation of the entire working layer, a laser may be used to heat treat the working layer as described above, to first form the subsurface layer. In such instances the laser may be moved along the same deposition path as the print head, or may be moved in another manner depending on heat treatment that is desired. Alternatively, and as noted above, a laser may be used to heat treat a working layer "in line" i.e., as the working layer is being deposited by the print head. In such instances, the print head and/or stage may be moved relative to one another during formation of a working layer, such that the print head deposits precursor material of a working layer on the stage or a previous layer along a deposition path.

After a portion of the working layer is deposited, a laser may be used to heat treat the deposited portion of the working layer to convert the precursor material first to a subsurface layer and then to a graphitic layer. For example, the systems and methods may utilize a laser that is positioned such that a laser spot is incident on a position just downstream of the outlet of the print head and/or just downstream of a compression head. In such instances the laser may treat the precursor material shortly after it is deposited by the print head and/or is compressed by the compression head. As noted above, treatment with the laser converts the precursor material of the working layer into a first subsurface layer (graphitized carbon foam cellular material). Another working layer of precursor material may then be deposited on the first carbon layer, and the process repeated to form another (second) subsurface layer on the previously deposited (first) carbon layer. In embodiments a discernible interface may be present between the first and second carbon layers. As used herein, "discernible interface" means an interface between two layers that is observable by a user with an optical microscope. Alternatively, the second subsurface layer may be formed such that there is no interface between it and the first subsurface layer, i.e., the first and second layers may form unitary part. The process may then be iteratively repeated to form a subsurface layer of a desired size.

Figure 14A:
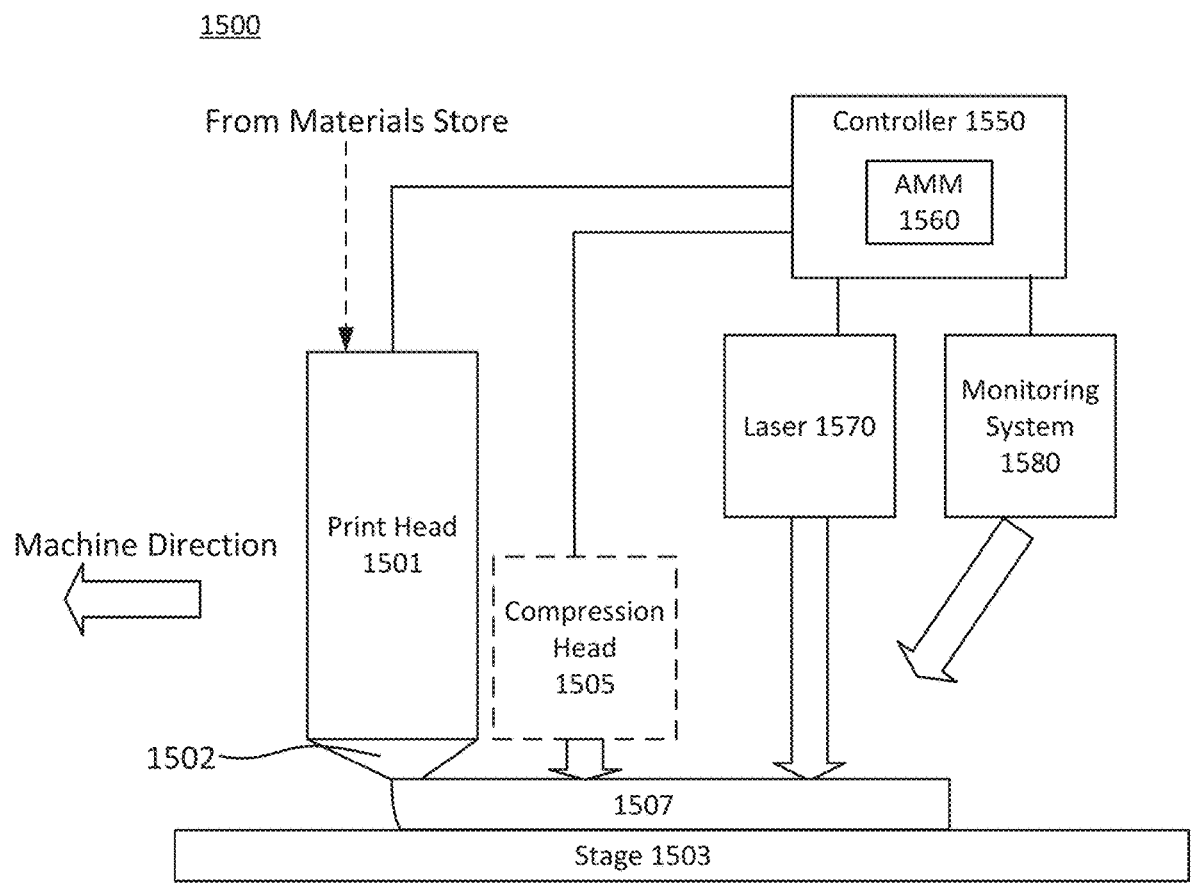
FIGS. 14A and 14B are schematic diagrams showing the components and example operation of one example of a system for printing composite parts consistent with the present disclosure.
Figure 14B:
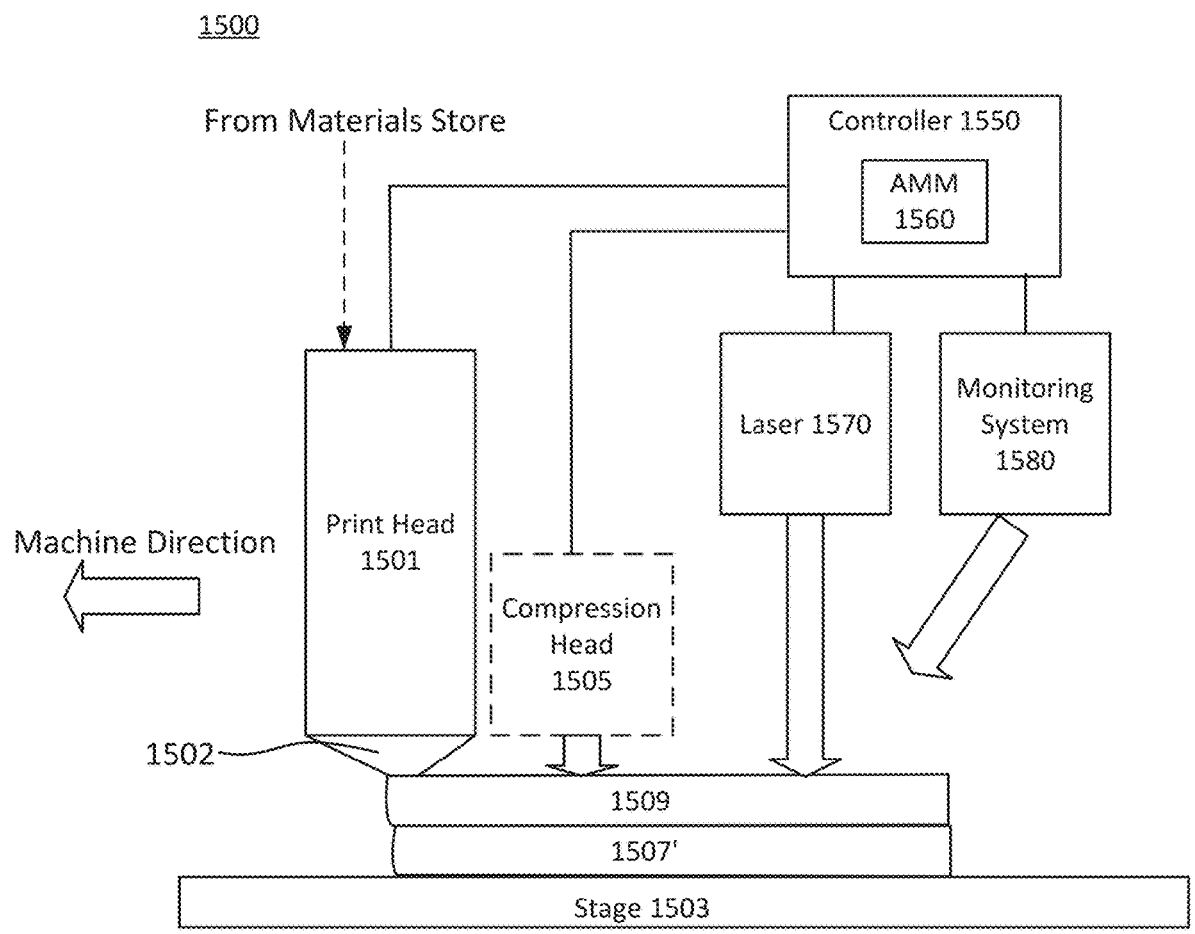

Reference is now made to FIGS. 14A and 14B, which are block diagrams of one example of an additive manufacturing system 1500 for forming a composite part via additive manufacturing in accordance with the present disclosure. For simplicity and ease of understanding FIG. 14A depicts system 1500 as it forms a first subsurface layer 1507 on stage 1503, and FIG. 14B depicts system 1500 as it forms a subsequent graphitic layer 1509 on formed subsurface layer 1507 to form a composite part.

As shown, additive manufacturing system 1500 includes a print head 1501, a substantially planar stage 1503, an optional compression head 1505, a controller 1550 with an additive manufacturing module (AMM) 1560, a laser 1570, and a monitoring system 1580. Such components may be mounted to or within a frame (not shown) as understood in the art. Print head 1501, optional compression head 1505, laser 1570, monitoring system 1580, and stage 1503 may be moveable relative to one another. For example, stage 1503 may be a movable stage that is coupled to a motor (e.g., a stepper motor) such that it is movable relative to print head 1501, compression head 1505, laser 1570, and/or monitoring system 1580. Alternative, or additionally, one or more of print head 1501, compression head 1505, laser 1570, and/or monitoring system 1580 may be movable relative to stage 1503. For example, one or more of such components may be mounted to a movable gantry (not shown), wherein the gantry is repositionable (e.g., by controller 1550) to move such components relative to stage 1503. In any event, the components of system 1500 may be configured such that a working layer is deposited (on the stage or on a previously deposited layer) in a machine direction. Movement of the stage 1503 and other components of system 1500 may be coordinated and controlled by controller 1550, which may be in wired or wireless communication therewith.

In general, print head 1501 is configured to deposit a precursor material onto stage 1503 and/or a previously deposited layer to form a working layer. In that regard print head 1501 may in response to a control signal from controller 1550, deposit precursor material of a working layer along a machine direction, e.g., as print head 1501 and/or stage 1503 is/are moved relative to one another. In preferred embodiments, print head 1501 is coupled to a materials store, from which it may receive precursor material for deposition as a working layer. Alternatively, or additionally, the print head may include a reservoir for storing precursor material prior to deposition. In any case, print head may include a nozzle 1502 that includes an opening (not shown), through which precursor material moves as it is deposited on stage 1503 and/or a previously deposited layer. The precursor material deposited by print head 1501 may be any suitable material described herein that can be converted to a subsurface layer in response to heat treatment with a laser.

The precursor material may be in any suitable form, such as in the form of a powder blend, a composite of the polymer based resin and the additive, or the like. In certain preferred embodiments the precursor material is preferably a powder blend that includes powdered polymer based resin and powdered additive, wherein the particles of polymer based resin and additive are separate from one another and are selected from the above noted materials.

Alternatively, in other embodiments the precursor material is a composite that includes a matrix of polymer based resin containing particles of the additive. For example, the precursor material may preferably include a matrix of PEKK (or other polymer based material) and additive particles (e.g., graphite single or multiwalled carbon nanotubes).

Print head 1501 may be configured to deposit the precursor material on stage 1503 or a previously deposited layer in any suitable manner. In embodiments the precursor material is preferably in the form of particles (e.g., a blend of particles of polymer resin and additive or composite particles containing a polymer resin matrix with additive therein). In such instances print head 1501 and nozzle 1502 may deposit the particles of precursor material on the surface of stage 1503 or a previously deposited layer, e.g., along a deposition path, resulting in the formation of all or a portion of a first working layer 1507.

In certain embodiments print head and/or nozzle are preferably configured to heat the precursor material prior to its deposition on stage 1503 or a previously deposited layer. Such heating may be performed to soften, e.g., the polymer based resin of the precursor material, which may enhance contact between the polymer based resin and any additive therein. Softening of the polymer based resin may also be performed to facilitate the formation of a working layer on stage 1503 and/or adhesion of the working layer to a previously deposited layer. As may be appreciated, heating of the precursor material by print head 1501 may be particularly useful when the polymer based resin of the precursor material is or includes a thermoplastic polymer. As the precursor material of first working layer 1507 is being deposited (or after it is completely deposited), it may optionally be compressed, e.g., with a compression head 1505. When used, compression head 1505 is generally configured to compress the surface of a working layer, e.g., to increase the density of the precursor material and/or force particles thereof closer to one another. Any suitable compression devices may be used as compression head, provided they can compress all or a portion of the working layer. In certain preferred embodiments, the compression head is or includes a flat plate or surface that can be compressed against an upper surface of the working layer. Such compression may be performed as the working layer is being deposited by print head 1501, or after deposition of the entire working layer. Like print head 1501, optional compression head 1505 may be heated, e.g., such that the precursor material is warmed by contact with the compression head. As noted above, such warming can improve contact between the polymer-based resin and any additive in the precursor material.

The degree to which compression head 1505 (or another compression tool) is used to compress the working layer is not limited, and any suitable amount of compression may be used. In embodiments, compression head is configured to apply a compression force in a range of 5 Newtons to 37 Newtons, on the working layer.

The thickness of first working layer 1507 may affect the heat treatment thereof, e.g., with laser 1570. It may therefore be desirable to select from a first working layer 1507 (and any subsequent working layers) with a controlled thickness. In embodiments the thickness of the working layers formed by print head 1501 is preferably in the range 8.0 mm to 150.0 mm.

During or following the deposition of the working layer 1507, system 1500 may subject the working layer 1507 to selective heat treatment with laser 1570. In general, laser 1570 is configured to perform selective heating operations on all or a portion of a working layer, e.g., in accordance with the parameters discussed above in connection with FIGS. 1-8B.

More specifically, laser 1570 is generally configured to irradiate at least a portion of first working layer 1507 with a spot of laser light, resulting in heating of the first working layer 1507 proximate to the spot. With that in mind, the parameters of the laser (power, spot size, residence time, hatch, etc.) are preferably selected to convert all or a portion of the first working layer 1507 to a temperature that converts all or a portion of the precursor material first to a subsurface layer (graphitized foam cellular material) with a desired microstructure and/or properties as discussed above. Then, the graphitized foam cellular material (103 in FIG. 1) may be converted to the upper graphitic layer (105 in FIG. 1).

Depending on the laser parameters, application of the laser 1570 may or may not alter the structure of additives in the precursor material. For example, when the precursor material of first working layer 1507 includes a powder of polymer-based resin and a graphite powder (e.g., graphic carbon nanotubes), application of laser 1570 may convert the polymer-based resin to carbon (e.g., graphitic carbon, amorphous carbon, etc.), but may or may not change the structure of the graphite powder. Thus, following application of laser 1570, the graphite content of the graphite powder may increase, decrease, or remain the same. In addition, the graphite particles may be fused or unfused following application of the laser 1570. Without limitation, application of laser 1570 preferably fuses at least a portion of the carbon formed by conversion of the polymer based resin, to itself and/or to carbon in any additive included in the precursor material. As laser 1570 generally operates in the same manner as laser 203, further details of the operation of laser 1570 are not reiterated.

Monitoring system 1580 generally functions to monitor selective heating operations performed by laser 1570 and to provide sensor signals to controller 1550, e.g., to facilitate adjustment of those selective heating operations as they are being performed. As the nature, configuration, and operation of monitoring system and controller 1550 to adjust the selective heating operations is the same as described above in connection with controller 201, monitoring system 205, and SHM 206, such details are not reiterated.

As noted above controller 1550 includes an additive manufacturing module (AMM 1560). AMM 1560 is configured to cause controller 1550 to control the selective heating of a working layer by laser 1570 in the same manner as SHM 206 described above. In addition, AMM 1560 is configured to cause controller 1550 to instigate and control the performance of additive manufacturing operations, such as but not limited to the operation of print head 1501 and/or stage 1503 to form one or more working layers. In embodiments, AMM 1560 is in the form of logic that is implemented at least in part in hardware to perform additive manufacturing and selective heating operations consistent with the present disclosure. For example, AMM 201 may be in the form of computer readable instructions which when executed by a processor (e.g., of controller 1550) may cause controller 1550 to perform or instigate performance of additive manufacturing and selective heating operations with print head 1501, stage 1503, compression head 1505, laser 1570, and monitoring system 1580. Examples of additive manufacturing operations include depositing a working layer with print head 1501, moving print head 1501 and/or stage 1503, compressing a working layer with compression head 1505, etc. Examples of selective heating operations that may be performed include treating a working layer 1507 with laser 1570 to convert all or a portion of the precursor material therein to subsurface layer (graphitized carbon foam cellular material). In embodiments, AMM 1560 is configured to cause controller 1550 to perform the operations of FIG. 16, which is described below. Following treatment with laser 1570, all or a portion of the precursor material in first working layer 1507 may be converted to a subsurface layer, resulting in the formation of a first subsurface layer 1507' as shown in FIG. 14B. Controller 1550 may then cause the deposition of a precursor material to form a second working layer 1509 on the surface of the first layer 1507', as shown. Deposition of the second working layer 1509 on the first layer 1507' may be performed in substantially the same manner as first working layer 1507, and thus is not reiterated.

The composition and the thickness of the second working layer 1509 may be the same as or different from the composition and thickness of the first working layer. Without limitation, in embodiments the composition of the precursor material forming the second working layer 1509 is the same as the composition of the precursor material forming the first working layer 1507, and the thickness of the second working layer 1509 is preferably within the above noted thickness ranges for first working layer 1507. In other embodiments the composition of the precursor material forming the second working layer 1509 differs from the composition of the precursor material forming the first working layer 1507, and the thickness on the second working layer 1509 is preferably within the above noted thickness ranges for first working layer 1507.

As the second working layer 1509 is deposited (or after the entire working layer 1509 is formed), the controller may cause system 1500 to perform selective heating operations on the second working layer 1509, e.g., with laser 1570. Performance of the selective heating operations on the second working layer 1509 may convert at least a portion of the precursor material of the second working layer 1509 to another subsurface layer (graphitized carbon foam cellular material).

Application of the selective heat treatment of the second working layer 1509 can then convert the second working layer to a graphitic layer. The graphitic layer may then again be characterized by having a relatively higher amount of graphite and/or graphene as comparted to the graphite content of the subsurface layers. In addition the graphitic layer will again indicate a thermal conductivity on its surface that is at least twice the thermal conductivity of its thickness or more preferably in the preferred range of twice to twenty times the thermal conductivity that the graphitic layer has in thickness. With regard to the thermal conductivity on the surface, it is again preferably such that it falls in the range of about 10 Watts per meter per Kelvin to about 600 Watts per meter per Kelvin, where such thermal conductivity is in a direction that is parallel to the graphitic layer surface.

The process may then be repeated, with additional working layers deposited and converted to additional subsurface or graphitic layers until a composite with a desired thickness is formed. Using this approach, parts with a preferred thickness in the range of 8.0 mm to 150.0 mm are provided. Of course, the systems and methods described herein are not limited to forming parts with such preferred thickness, and may be used to form a composite part with any suitable thickness.

Figure 15:
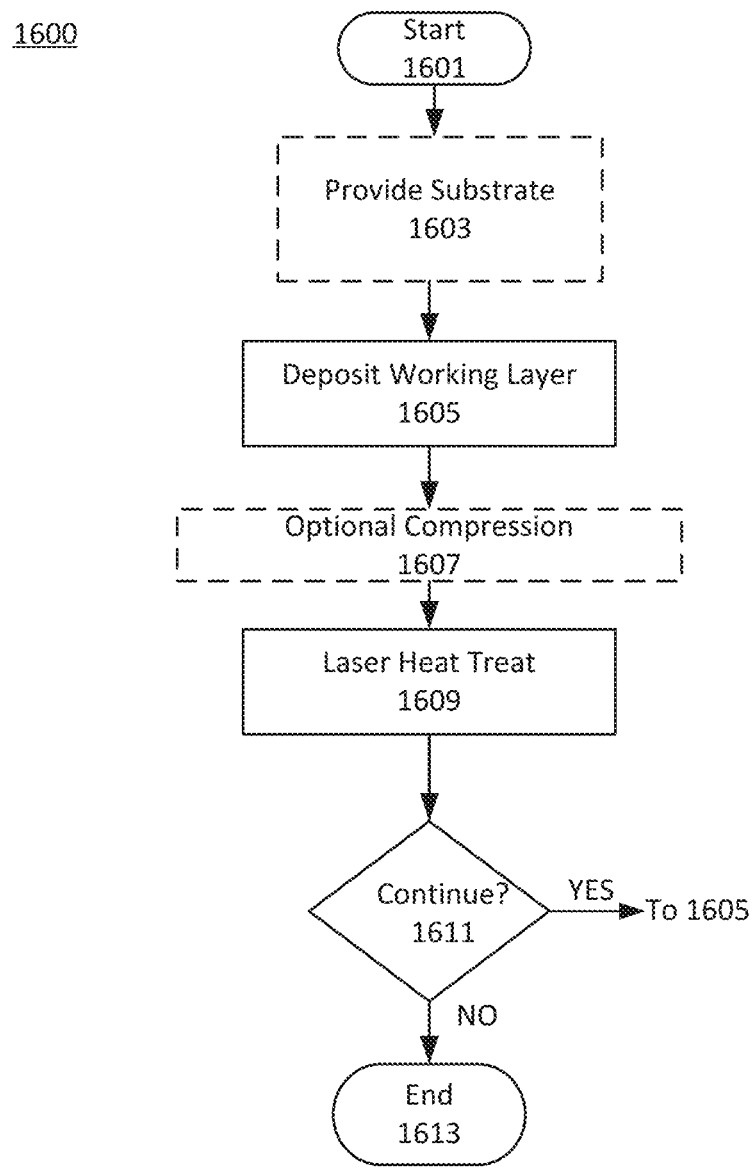
FIG. 15 is a flow chart of example operations of one example of a method of printing composite parts consistent with the present disclosure.

Reference is made to FIG. 15, which is a flow diagram of example operations of one example of a method of making a composite part herein via additive manufacturing consistent with the present disclosure. As shown, method 1600 begins with block 1600. The method then proceeds to optional block 1603, pursuant to which a substrate stage may be provided. The operations of block 1603 may be desired when the composite part is to be formed on and potentially fused with a pre-existing part (i.e., with the substrate stage).

Following block 1603 or if the operations of block 1603 are omitted the method may proceed to block 1605, pursuant to which a working layer may be deposited. Deposition of the working layer may be performed by depositing a precursor material with a print head of an additive manufacturing system, as discussed above in connection with FIGS. 14A and 14B. The method may then proceed to optional block 1607, pursuant to which the working layer may be compressed, e.g., after it is partially or completely deposited. Compression of the working layer may be performed in any suitable manner, such as with a compression head as discussed above.

Following the operations of block 1607 or if such operations are omitted the method may proceed to block 1609, pursuant to which the working layer may be subject to selective heat treatment with a laser. The manner in which the selective heat treatment may be performed is the same as described above in connection with FIGS. 15A and 15B.

As noted, the heat treatment is performed to convert the working layer to a subsurface layer and then to a graphitic layer as described herein. Following such heat treatment the method may proceed to block 1611, pursuant to which a decision may be made as to whether the method is to continue. The outcome of block 1611 may be conditioned on whether a current working layer is a last working layer of the part being formed. If not, the method may loop back to block 1605, but if so the method may proceed to block 1613 and end.

To illustrate the concepts described above in connection with FIGS. 14A, 14B and 15, an example for forming a composite part herein using an additive manufacturing process will now be described in connection with FIGS. 16-17. In this example, a 50:50 mixture of particles of polyetheretherketone (PEKK—purchased from ARKEMA KEPSTEIN) and graphite powder was used as a precursor material. The precursor material was supplied to a print head of an additive manufacturing system consistent with system 1500 in FIGS. 14A, 14B.

A controller of the system caused the print head to successively deposit working layers of precursor material on a stage, which were then compressed. The resulting compressed working layer was then heat treated with laser light from a 90 watt neodymium yttrium aluminum garnet (Nd:YAG) laser. The laser was operated at 40% power with a spot size of 1.064 millimeters as the stage was moved. The heat treatment with the laser was visually observed to result in a change in the physical structure of the material.

Figure 16:
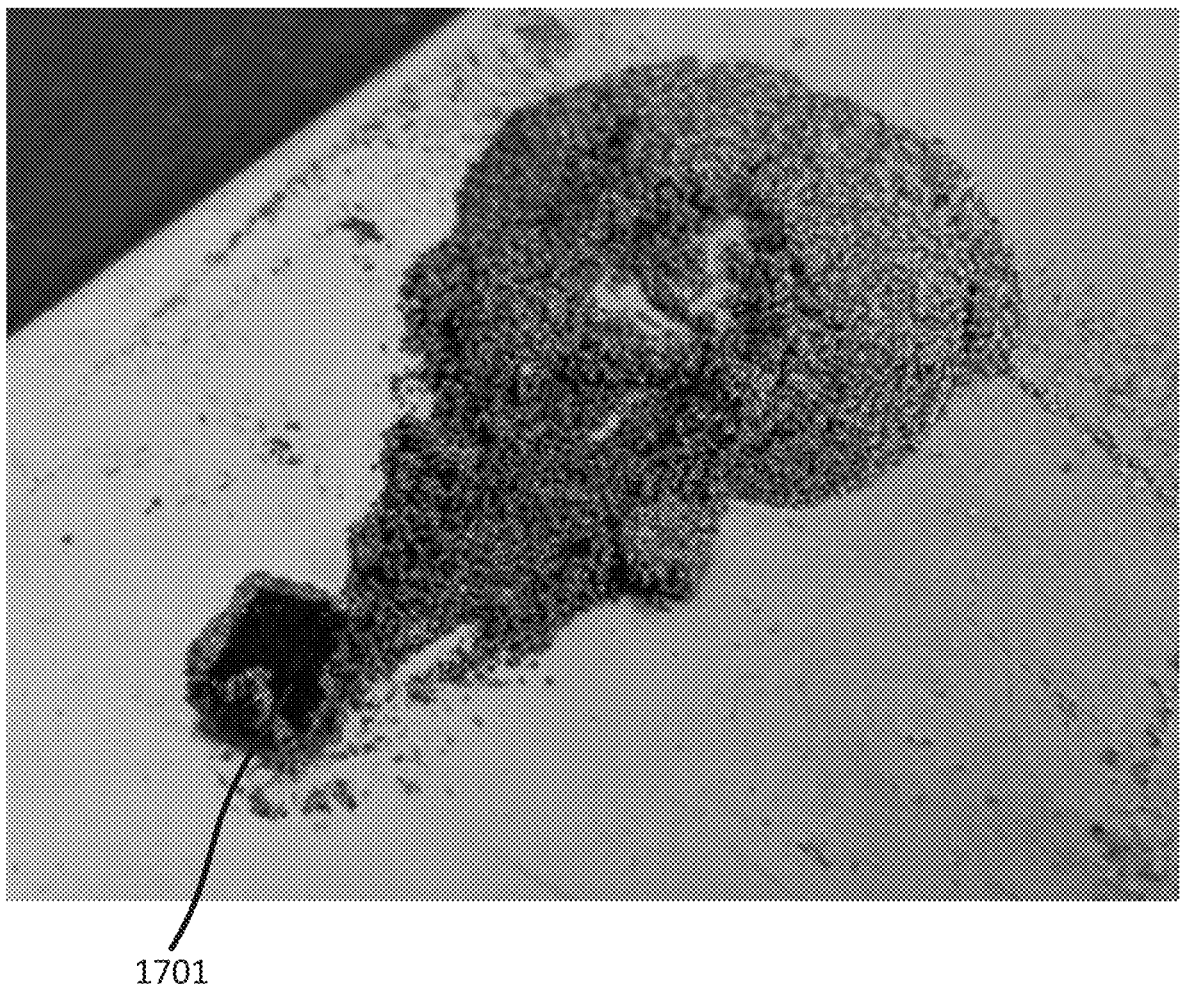
FIG. 16 is an optical photograph of a layer of 50:50 blend of graphite powder and polyetheretherketoneketone (PEKK) powder, a portion of which has been compressed and heated with a laser, consistent with the present disclosure.
Figure 17:
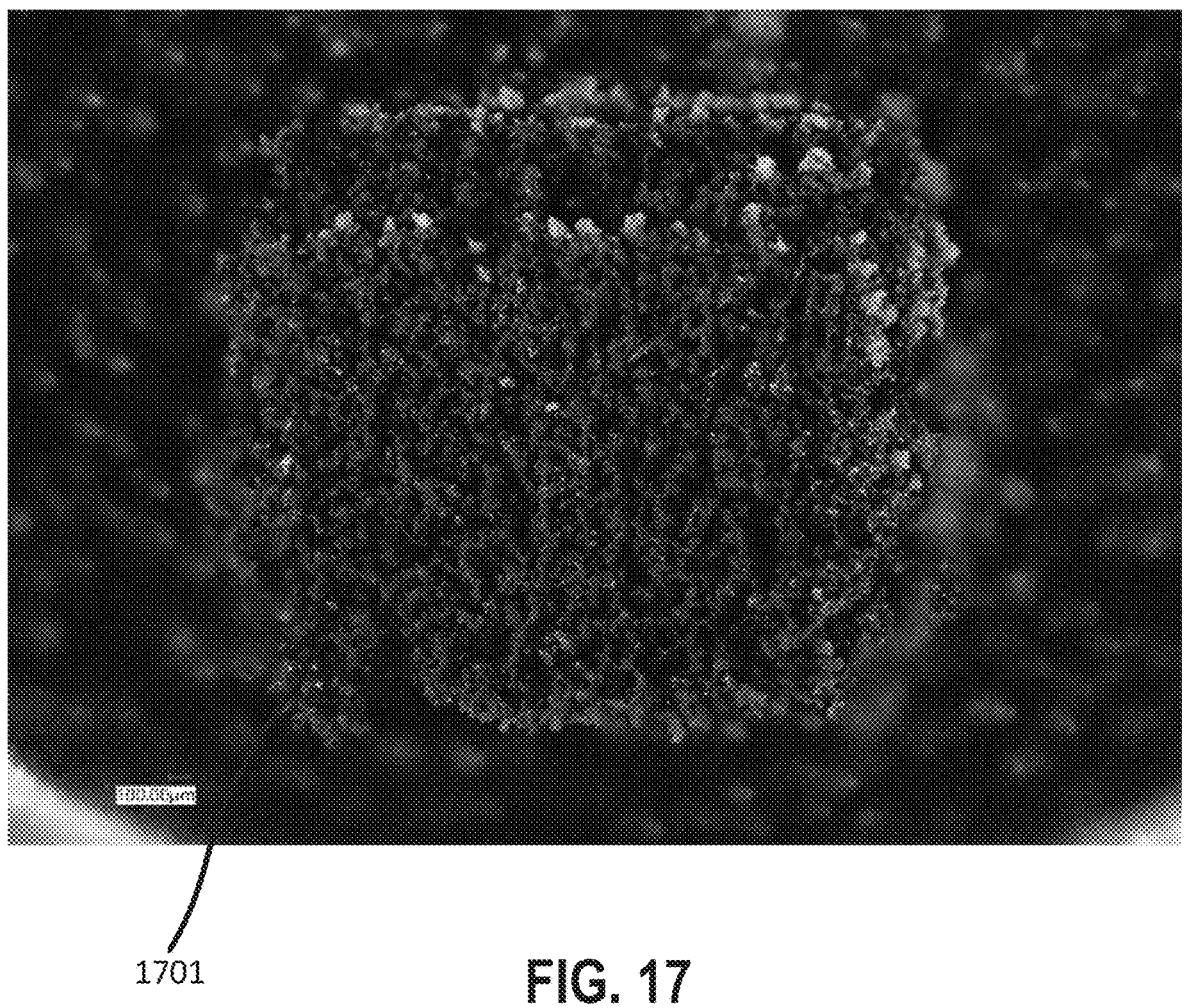
FIG. 17 is an optical photograph of a printed part formed from the 50:50 blend of graphite and PEKK powder of FIG. 16.
Figure 18:
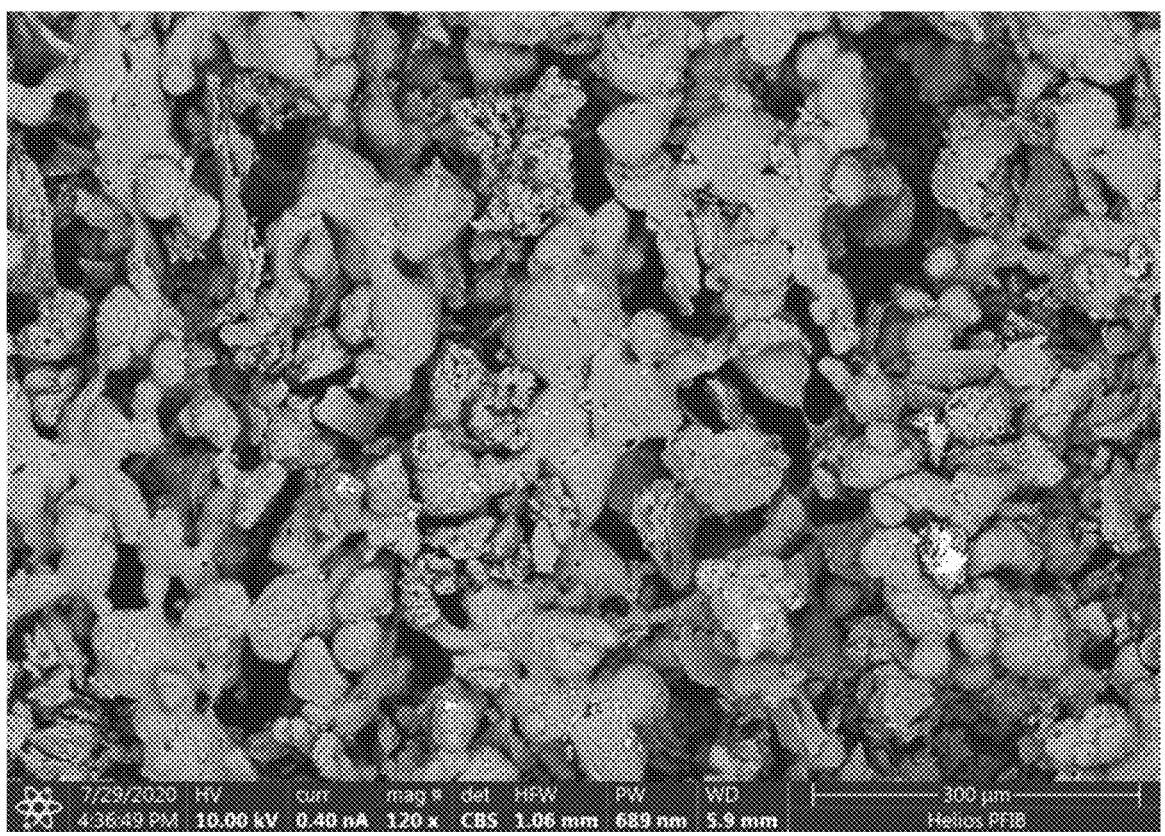
FIG. 18 a scanning electron microscope (SEM) image of the printed part of FIG. 17.

For example, and as shown in FIG. 16, following heat treatment the color of the layer of precursor changed from a combination of white and black (shown in the upper portion of the figure) to a relatively uniform dark black (shown in the lower left of the figure), suggesting that at least a portion of the PEKK particles were converted to the formation of a first subsurface layer (a cellular structure including graphite). The print head was then used to deposit a second working layer of precursor material on the first subsurface layer, And the process was repeated. This process was iterated until a part 1701 having a thickness of about 100 μm and a porous microstructure was formed, as shown in FIG. 17. Scanning electron micrograph images of the part showed that the porous microstructure of the part 1701 contained many pores, as demonstrated in FIG. 18. Additional laser treatment of the cellular structure including graphite can then provide the graphitic surface layer, wherein the upper graphitic layer comprises graphite in an amount greater than the graphite is said subsurface layer.

As used herein the term "about" when used in reference to a value or a range means +/−5% of the indicated value or range.

As used herein the term "on" when used in connection with a first layer and a second layer, means that one of the layers is positioned above the other layer but is not necessarily in direct contact with the other layer. That is, a "first layer on a second layer" means that the first layer is positioned above the second layer but allows for the presence of intermediate layers between the first and second layers. In contrast, the term "directly on" means that a first layer is in direct contact with a second layer. While the presence disclosure focuses on and illustrates embodiments in which a graphitic layer is directly on a subsurface layer, such a structure is not required, and graphitic and subsurface layers may be arranged in any suitable manner.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the features, structures, or characteristics may be combined in any suitable manner in one or more embodiments.

What is claimed:

1. A method of forming a composite part comprising:
providing a substrate having polymer resin and one or a plurality of additives;
performing, with a laser, a first heating operation on said polymer resin and one or a plurality of additives and forming a subsurface layer on the substrate, said subsurface layer comprising graphite with a cellular structure;
performing, with a laser, a second heating operation on said subsurface layer and forming a graphitic surface layer on said subsurface layer, wherein the graphitic layer comprises graphite in an amount greater than the graphite present in said subsurface layer wherein said subsurface layer has a surface and a thickness perpendicular to said surface in the range of greater than or equal to about 500 microns to about 5.0 mm.

2. The composite part of claim 1 wherein said graphitic layer has a surface and a thickness perpendicular to said graphitic surface in the range of about 300 microns to about 1.5 mm.

3. The method of claim 1 wherein said polymer resin selected from the group consisting of phenolic resins, polyaryletherketones (PAEK), polyether ketones (PEK), polyetheretherketone (PEEK) or polyetherketoneketone (PEKK), polyether ketone ether ketone (PEKEKK), polyetherimide (PEI), polyimides, polyphenylene, polyarylacetylene, phthalonitrile, benzoxazine, PAEK co-polymer with PEI and/or polyethersulfone (PES), polyphenylenesulfide (PPS), and blends thereof.

4. The method of claim 1 wherein said additives are selected from the group consisting of carbon fibers, single and/or multi-walled carbon nanotubes, graphene, graphene oxide, reduced graphene oxide, carbon black, and boron nitride nanotubes.

5. The method of claim 1 wherein said subsurface layer includes pores with a diameter of greater than 0 to about 150 microns.

6. The method of claim 1 wherein said subsurface layer has a through-plane, perpendicular to the surface having a thermal conductivity of less than or equal to about 5 Watts per meter per Kelvin.

7. The method of claim 1 wherein said graphitic layer has a surface and a thermal conductivity that is parallel to said graphitic layer surface in the range of about 10 Watts per meter per Kelvin to about 600 Watts per meter per Kelvin.

8. The method of claim 1 wherein said graphitic layer has a surface and a thickness, and a thermal conductivity in thickness ($TC_{THICKNESS}$) perpendicular to said graphitic layer surface, and a thermal conductivity parallel to said graphitic layer surface ($TC_{SURFACE}$), wherein:

$$TC_{SURFACE}=(2\text{-}100)\times(TC_{THICKNESS}).$$

9. The method of claim 1 wherein said method comprises additive manufacturing.

10. A method of forming a composite part comprising:
providing a substrate having polymer resin and one or a plurality of additives;
performing, with a laser, a first heating operation on said polymer resin and one or a plurality of additives and forming a subsurface layer on the substrate, said subsurface layer comprising graphite with a cellular structure;
performing, with a laser, a second heating operation on said subsurface layer and forming a graphitic surface layer on said subsurface layer, wherein the graphitic layer comprises graphite in an amount greater than the graphite present in said subsurface layer wherein said graphitic layer has a surface and a thickness perpendicular to said graphitic surface in the range of about 300 microns to about 1.5 mm.

11. A method of forming a composite part comprising:
providing a substrate having polymer resin and one or a plurality of additives;
performing, with a laser, a first heating operation on said polymer resin and one or a plurality of additives and forming a subsurface layer on the substrate, said subsurface layer comprising graphite with a cellular structure;
performing, with a laser, a second heating operation on said subsurface layer and forming a graphitic surface layer on said subsurface layer, wherein the graphitic layer comprises graphite in an amount greater than the graphite present in said subsurface layer wherein said graphitic layer has a surface and a thermal conductivity that is parallel to said graphitic layer surface in the range of about 10 Watts per meter per Kelvin to about 600 Watts per meter per Kelvin.

12. A method of forming a composite part comprising:
providing a substrate having polymer resin and one or a plurality of additives;
performing, with a laser, a first heating operation on said polymer resin and one or a plurality of additives and forming a subsurface layer on the substrate, said subsurface layer comprising graphite with a cellular structure;
performing, with a laser, a second heating operation on said subsurface layer and forming a graphitic surface layer on said subsurface layer, wherein the graphitic layer comprises graphite in an amount greater than the graphite present in said subsurface layer wherein said graphitic layer has a surface and a thermal conductivity that is parallel to said graphitic layer surface in the range of about 10 Watts per meter per Kelvin to about 600 Watts per meter per Kelvin.

13. A method of forming a composite part comprising:
providing a substrate having polymer resin and one or a plurality of additives;
performing, with a laser, a first heating operation on said polymer resin and one or a plurality of additives and forming a subsurface layer on the substrate, said subsurface layer comprising graphite with a cellular structure;
performing, with a laser, a second heating operation on said subsurface layer and forming a graphitic surface layer on said subsurface layer, wherein the graphitic layer comprises graphite in an amount greater than the graphite present in said subsurface layer wherein said graphitic layer has a surface and a thickness, and a thermal conductivity in thickness ($TC_{THICKNESS}$) perpendicular to said graphitic layer surface, and a thermal conductivity parallel to said graphitic layer surface ($TC_{SURFACE}$), wherein:

$$TC_{SURFACE}=(2\text{-}100)\times(TC_{THICKNESS}).$$

* * * * *